US012136394B2

(12) United States Patent
Nho et al.

(10) Patent No.: US 12,136,394 B2
(45) Date of Patent: Nov. 5, 2024

(54) SYSTEMS AND METHODS FOR EXTERNAL OFF-TIME PIXEL SENSING

(71) Applicant: Apple Inc., Cupertino, CA (US)

(72) Inventors: Hyunwoo Nho, Palo Alto, CA (US); Myungjoon Choi, Sunnyvale, CA (US); Hyunsoo Kim, Mountain View, CA (US); Mohammad Ali Jangda, Santa Clara, CA (US); Jie Won Ryu, Santa Clara, CA (US); Shiping Shen, Cupertino, CA (US); Kingsuk Brahma, Mountain View, CA (US); Chaohao Wang, Sunnyvale, CA (US); Wei H. Yao, Palo Alto, CA (US); Alex H. Pai, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 16/802,354

(22) Filed: Feb. 26, 2020

(65) Prior Publication Data

US 2020/0335040 A1 Oct. 22, 2020

Related U.S. Application Data

(60) Provisional application No. 62/836,592, filed on Apr. 19, 2019.

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0842* (2013.01);
(Continued)

(58) Field of Classification Search
None
See application file for complete search history.

(56) References Cited

U.S. PATENT DOCUMENTS 7,750,875 B2 7/2010 Kim et al.
7,834,824 B2 11/2010 Routley et al.
(Continued)

FOREIGN PATENT DOCUMENTS

WO 2018187092 A1 10/2018
WO 2019060127 A1 3/2019

*Primary Examiner* — Benjamin X Casarez
(74) *Attorney, Agent, or Firm* — Fletcher Yoder P.C.

(57) ABSTRACT

An electronic device includes a display having multiple regions of pixels. Each pixel includes a diode that emits light based on an amount of current through the diode and a transistor that controls the amount of current flowing through the diode. The electronic device includes driver-integrated circuitry that reduces hysteresis in a first transistor of a first pixel of a region of pixels, settles a threshold voltage of the first transistor, applies a test voltage to the first transistor, and senses a current across the first transistor. The electronic device includes processing circuitry that determines a predetermined voltage based on the current and a predetermined current-voltage relationship determined at an initial temperature, determines a voltage difference between the test voltage and the predetermined voltage, and applies the predetermined voltage and the voltage difference to a second transistor of a second pixel of the region of pixels.

20 Claims, 11 Drawing Sheets

(52) U.S. Cl.
CPC ............... *G09G 2310/0251* (2013.01); *G09G 2310/0262* (2013.01); *G09G 2310/04* (2013.01); *G09G 2320/0233* (2013.01); *G09G 2320/0295* (2013.01); *G09G 2320/045* (2013.01)

(56) References Cited

U.S. PATENT DOCUMENTS

| | | | | |
|---|---|---|---|---|
| 8,204,703 | B2 | 6/2012 | Govil et al. | |
| 9,262,965 | B2 | 2/2016 | Chaji et al. | |
| 2008/0231558 | A1* | 9/2008 | Naugler | G09G 3/3233 345/76 |
| 2008/0246785 | A1* | 10/2008 | Shirasaki | G09G 3/3233 345/212 |
| 2010/0225634 | A1* | 9/2010 | Levey | G09G 3/3208 345/212 |
| 2012/0293481 | A1* | 11/2012 | Chaji | G06F 1/3218 345/212 |
| 2015/0294622 | A1* | 10/2015 | Chaji | G09G 3/3291 345/80 |
| 2015/0379956 | A1* | 12/2015 | Nonaka | G09G 3/325 315/172 |
| 2016/0027382 | A1* | 1/2016 | Chaji | G09G 3/006 345/212 |
| 2016/0225314 | A1* | 8/2016 | Lee | G09G 3/3233 |
| 2016/0232834 | A1* | 8/2016 | Kimura | G09G 3/325 |
| 2017/0124954 | A1* | 5/2017 | Park | G09G 3/3258 |
| 2017/0186373 | A1* | 6/2017 | Nishikawa | G11C 19/28 |
| 2017/0263183 | A1* | 9/2017 | Lin | G09G 3/3233 |
| 2018/0033372 | A1* | 2/2018 | Kishi | G09G 3/3266 |
| 2018/0075798 | A1* | 3/2018 | Nho | G09G 3/32 |
| 2018/0082634 | A1* | 3/2018 | Wang | G09G 3/3233 |
| 2018/0158415 | A1* | 6/2018 | Chaji | G09G 3/3258 |
| 2018/0204303 | A1* | 7/2018 | Bae | G09G 3/3275 |
| 2018/0308425 | A1* | 10/2018 | Zhou | G09G 3/3291 |
| 2019/0057633 | A1* | 2/2019 | Li | G09G 3/3258 |
| 2020/0005716 | A1 | 1/2020 | Tan et al. | |
| 2020/0143744 | A1* | 5/2020 | Kim | G09G 3/3233 |
| 2020/0152135 | A1* | 5/2020 | Kang | G09G 3/3291 |
| 2020/0184887 | A1* | 6/2020 | Nien | G09G 3/3225 |
| 2021/0020105 | A1* | 1/2021 | Yin | G09G 3/3275 |

* cited by examiner

SYSTEMS AND METHODS FOR EXTERNAL OFF-TIME PIXEL SENSING

CROSS REFERENCE TO RELATED APPLICATIONS

This application claims priority from and the benefit of U.S. Provisional Application Ser. No. 62/836,592 entitled "SYSTEMS AND METHODS FOR EXTERNAL OFF-TIME PIXEL SENSING," filed Apr. 19, 2019, which is hereby incorporated by reference in its entirety for all purposes.

SUMMARY

The present disclosure relates generally to electronic displays and, more particularly, to devices and methods for achieving improvements in sensing attributes of a light emitting diode (LED) electronic display or attributes affecting an LED electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flat panel displays, such as active matrix organic light emitting diode (AMOLED) displays, micro-LED (μLED) displays, and the like, are commonly used in a wide variety of electronic devices, including such consumer electronics as televisions, computers, and handheld devices (e.g., cellular telephones, audio and video players, gaming systems, and so forth). Such display panels typically provide a flat display in a relatively thin package that is suitable for use in a variety of electronic goods. In addition, such devices may use less power than comparable display technologies, making them suitable for use in battery-powered devices or in other contexts where it is desirable to minimize power usage.

LED displays typically include picture elements (e.g. pixels) arranged in a matrix to display an image that may be viewed by a user. Individual pixels of an LED display may generate light as a voltage is applied to each pixel. The voltage applied to a pixel of an LED display may be regulated by, for example, thin film transistors (TFTs). For example, a circuit-switching TFT may be used to regulate current flowing into a storage capacitor, and a driver TFT may be used to regulate the voltage being provided to the LED of an individual pixel. The growing reliance on electronic devices having LED displays has generated interest in improvement of the operation of the displays.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relate to devices and methods for increased determination of the performance of certain electronic display devices including, for example, light emitting diode (LED) displays, such as organic light emitting diode (OLED) displays, active matrix organic light emitting diode (AMOLED) displays, or micro LED (μLED) displays. Under certain conditions, non-uniformity of a display induced by process non-uniformity temperature gradients, or other factors across the display should be compensated for to increase performance of a display (e.g., reduce visible anomalies). The non-uniformity of pixels in a display may vary between devices of the same type (e.g., two similar phones, tablets, wearable devices, or the like), vary over time and usage (e.g., due to aging and/or degradation of the pixels or other components of the display), and/or vary with respect to temperatures, as well as in response to additional factors.

To improve display panel uniformity, compensation techniques related to adaptive correction of the display may be employed. For example, as pixel response (e.g., luminance and/or color) can vary due to component processing, temperature, usage, aging, and the like, in one embodiment, to compensate for non-uniform pixel response, a property of the pixel (e.g., a current or a voltage) may be measured (e.g., sensed via a sensing operation) and compared to a target value that is, for example, stored in a lookup table or the like, to generate a correction value to be applied to correct pixel illuminations to match a desired gray level. In this manner, modified data values may be transmitted to the display to generate compensated image data (e.g., image data that accurately reflects the intended image to be displayed by adjusting for non-uniform pixel responses).

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
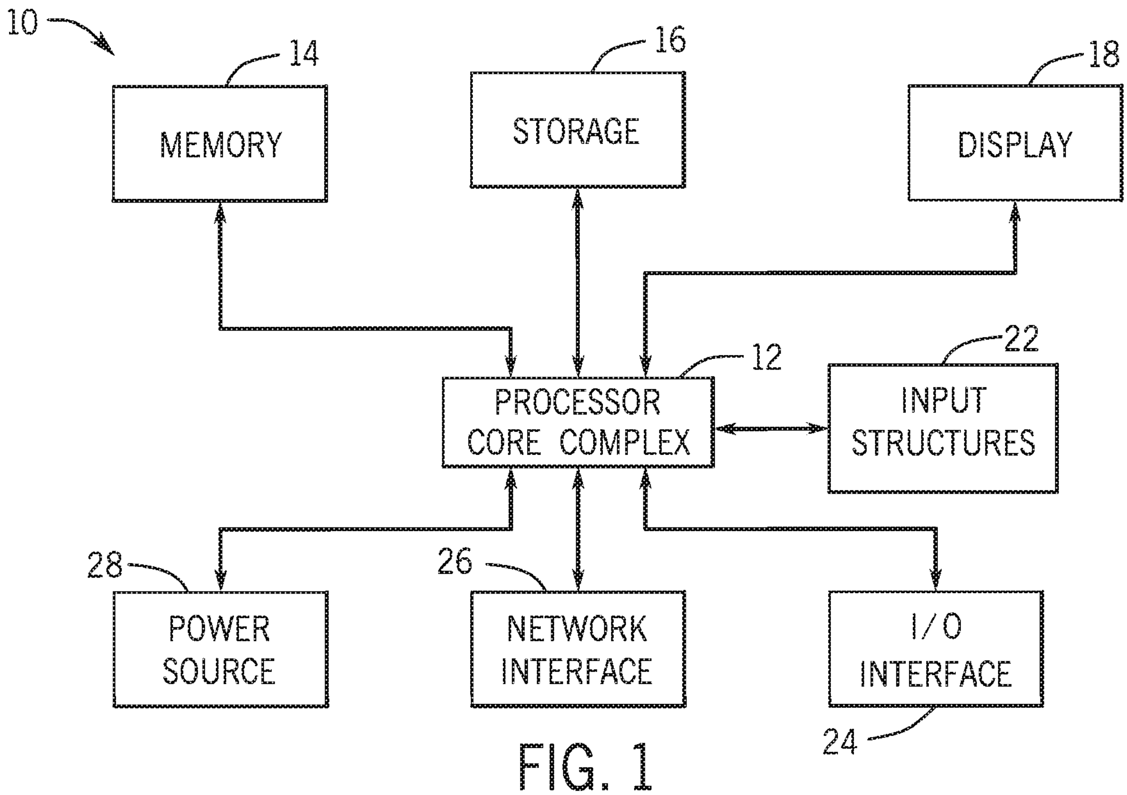
FIG. 1 is a schematic block diagram of an electronic device that performs display sensing and compensation, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are ubiquitous in modern electronic devices. As electronic displays gain ever-higher resolutions and dynamic range capabilities, image quality has increasingly grown in value. In general, electronic displays contain numerous picture elements, or "pixels," that are programmed with image data. Each pixel emits a particular amount of light based on the image data. By programming different pixels with different image data, graphical content including images, videos, and text can be displayed.

Display panel sensing allows for operational properties of pixels of an electronic display to be identified to improve the performance of the electronic display. For example, variations in temperature and pixel aging (among other things) across the electronic display cause pixels in different locations on the display to behave differently. Indeed, the same image data programmed on different pixels of the display could appear to be different due to the variations in temperature and pixel aging. Without appropriate compensation, these variations could produce undesirable visual artifacts. However, compensation of these variations may hinge on proper sensing of differences in the images displayed on the pixels of the display. Accordingly, the techniques and systems described below may be utilized to enhance the compensation of operational variations across the display.

Figure 2:
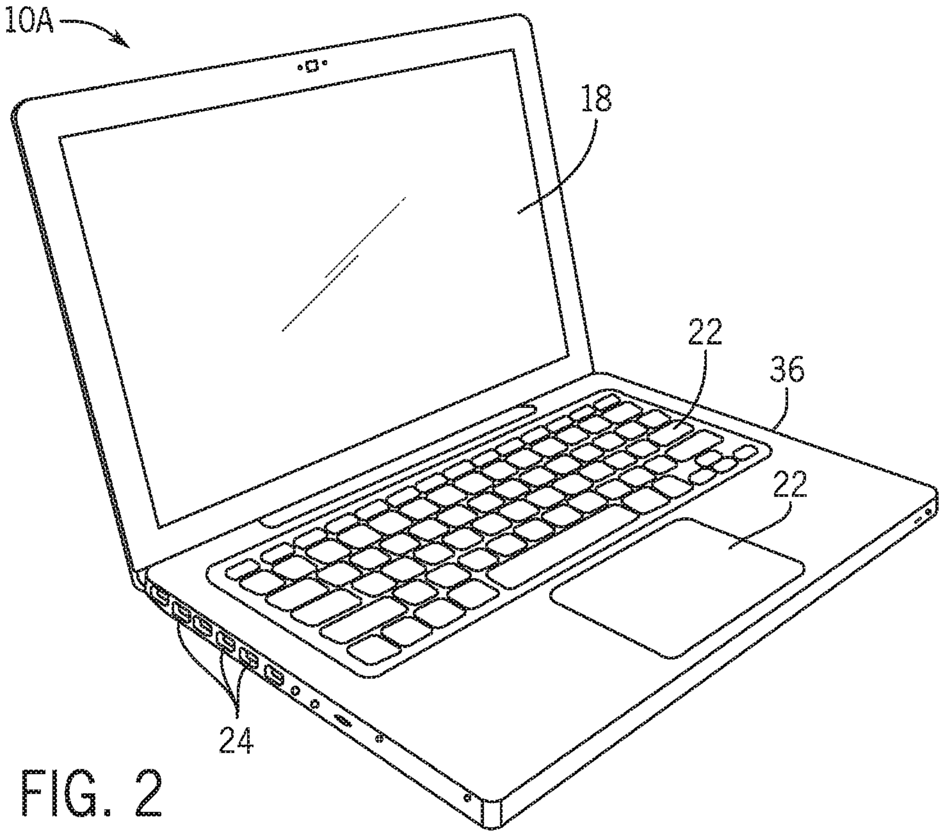
FIG. 2 is a perspective view of a notebook computer representing an embodiment of the electronic device of FIG. 1.
Figure 4:
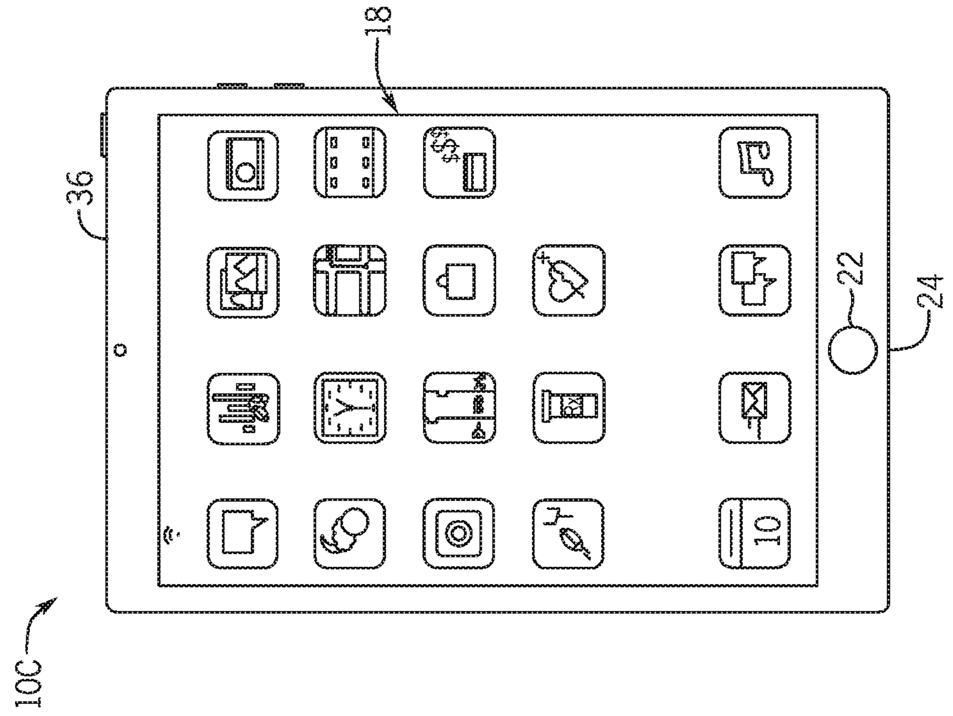
FIG. 4 is a front view of another hand-held device representing another embodiment of the electronic device of FIG. 1.
Figure 3:
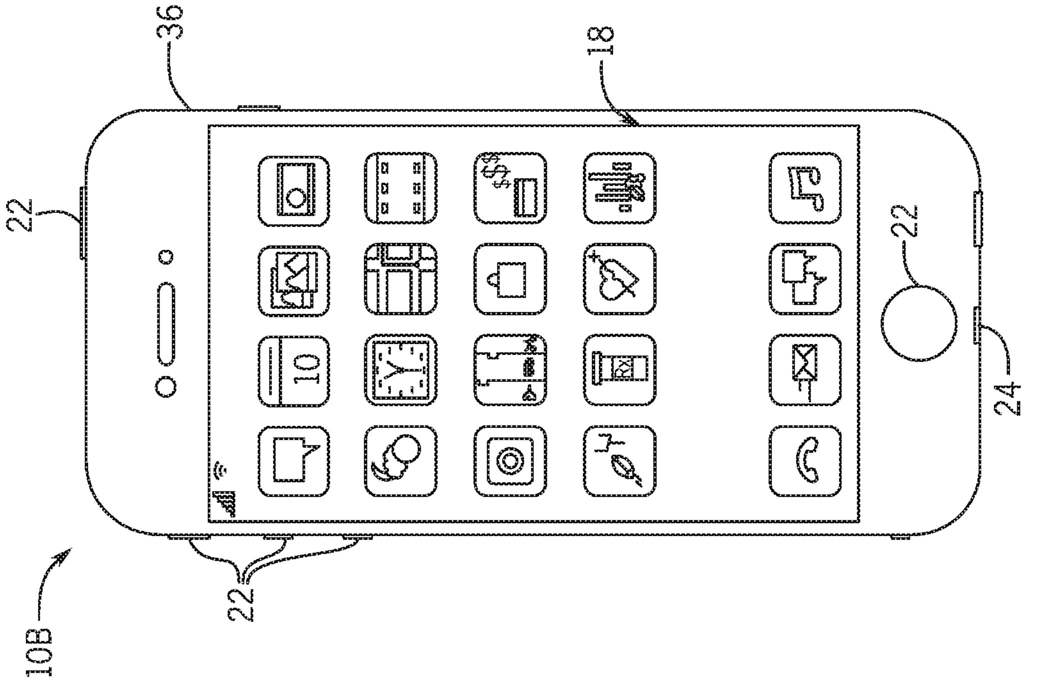
FIG. 3 is a front view of a hand-held device representing another embodiment of the electronic device of FIG. 1.
Figure 5:
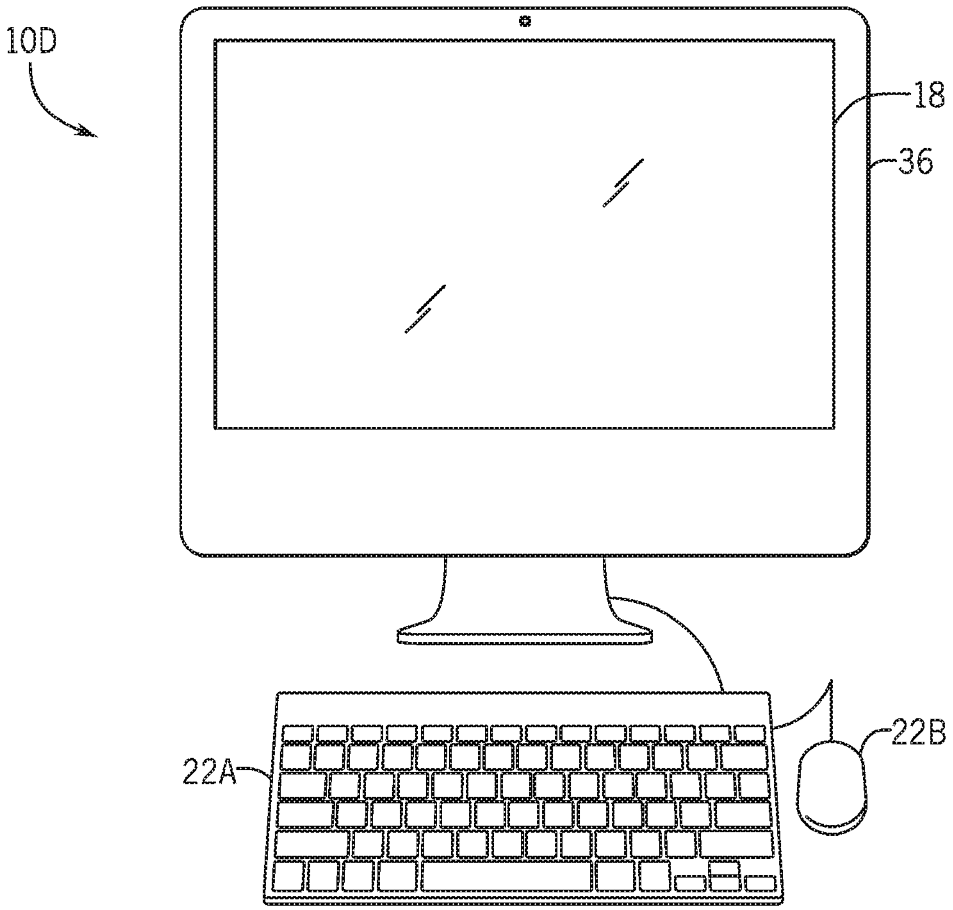
FIG. 5 is a front view of a desktop computer representing another embodiment of the electronic device of FIG. 1.
Figure 6:
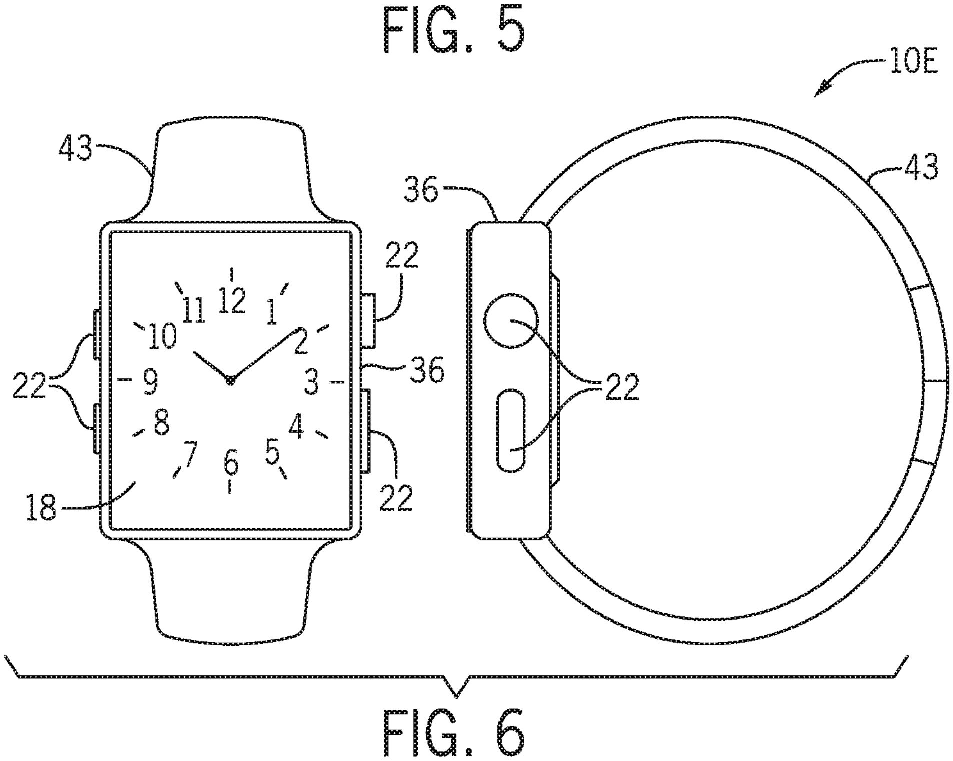
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, network interfaces 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as causing the electronic display 18 to perform display panel sensing and using the feedback to adjust image data for display on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10. The electronic display 18 may employ display panel sensing to identify operational variations of the electronic display 18. This may allow the processor core complex 12 to adjust image data that is sent to the electronic display 18 to compensate for these variations, thereby improving the quality of the image frames appearing on the electronic display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
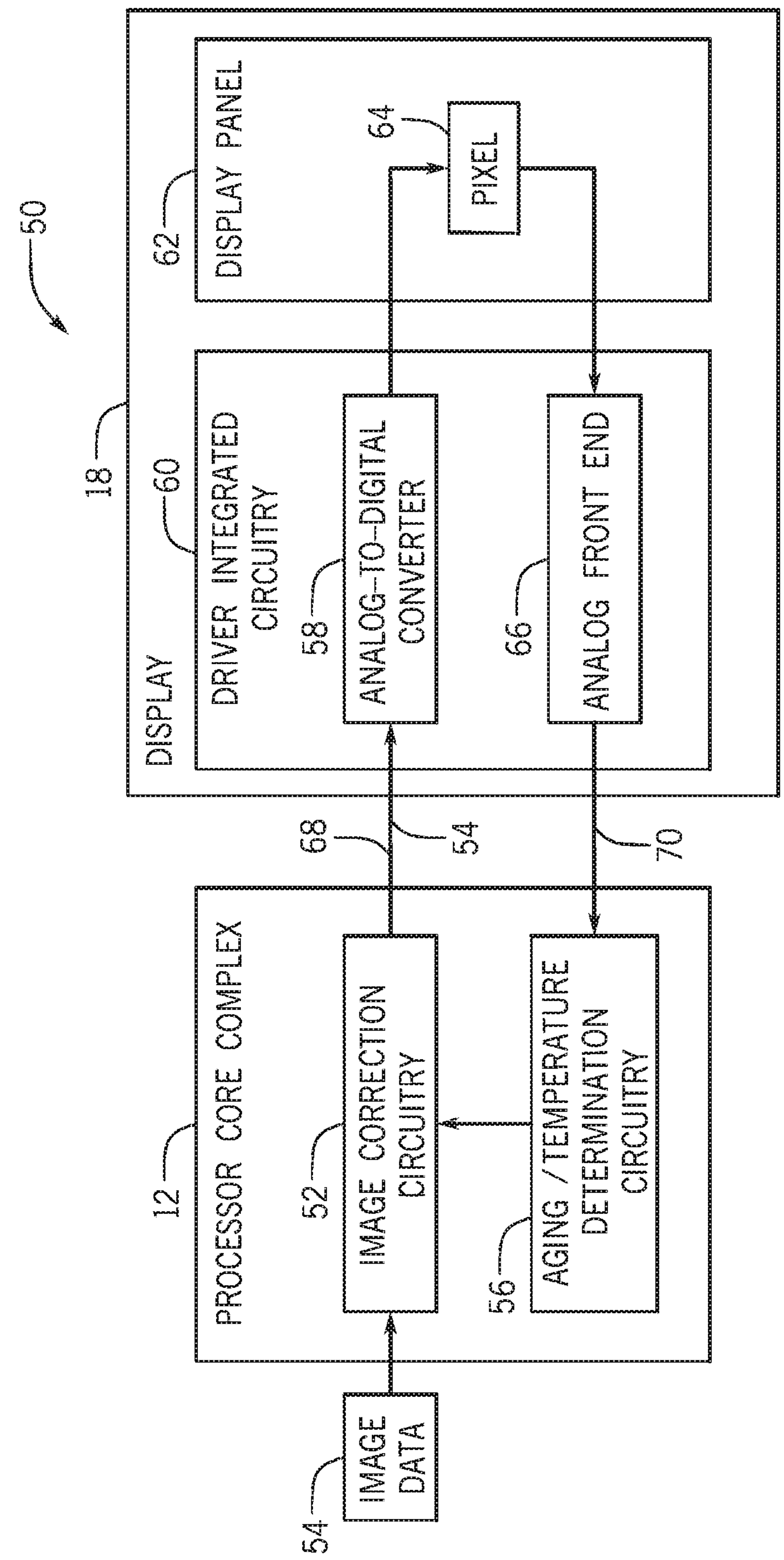
FIG. 7 is a block diagram of a system for display sensing and compensation of the electronic device of FIG. 1, according to an embodiment of the present disclosure.

FIG. 7 is a block diagram of a system 50 for display sensing and compensation of the electronic device 10 of FIG. 1, according to an embodiment of the present disclosure. The system 50 includes the processor core complex 12, which includes image correction circuitry 52. The image correction circuitry 52 may receive image data 54, and compensate for non-uniformity of the display 18 based on and induced by process non-uniformity temperature gradients, aging of the display 18, and/or other factors across the display 18 to increase performance of the display 18 (e.g., by reducing visible anomalies). The non-uniformity of pixels in the display 18 may vary between devices of the same type (e.g., two similar phones, tablets, wearable devices, or the like), over time and usage (e.g., due to aging and/or degradation of the pixels or other components of the display 18), and/or with respect to temperatures, as well as in response to additional factors.

As illustrated, the system 50 includes aging/temperature determination circuitry 56 that may determine or facilitate determining the non-uniformity of the pixels in the display 18 due to, for example, aging and/or degradation of the pixels or other components of the display 18. The aging/temperature determination circuitry 56 that may also determine or facilitate determining the non-uniformity of the pixels in the display 18 due to, for example, temperature. The variation in temperature may be due to changes in ambient temperature and/or a proximity of the pixels to a heat source (e.g., a fingertip of a user). In some cases, the pixels may be lay on top of or be in otherwise close proximity to other components of an electronic device that may be more densely packed with components due to the relatively small size of the electronic device (e.g., handheld, mobile, or portable electronic devices such as 10B, 10C, 10E). As such, the variation in temperature may be due to operation of the components that the pixels are laying on top of or are in close proximity to.

The image correction circuitry 52 may send the image data 54 (for which the non-uniformity of the pixels in the display 18 have or have not been compensated for by the image correction circuitry 52) to analog-to-digital converter 58 of a driver-integrated circuit 60 of the display 18. The analog-to-digital conversion converter 58 may digitize then image data 54 when it is in an analog format. The driver-integrated circuit 60 may send signals across gate lines to cause a row of pixels of a display panel 62, including pixel 64, to become activated and programmable, at which point the driver-integrated circuit 60 may transmit the image data 54 across data lines to program the pixels, including the pixel 64, to display a particular gray level (e.g., individual pixel brightness). By supplying different pixels of different colors with the image data 54 to display different gray levels, full-color images may be programmed into the pixels. The driver-integrated circuit 60 may also include a sensing analog front end (AFE) 66 to perform analog sensing of the response of the pixels to data input (e.g., the image data 54) to the pixels.

The processor core complex 12 may also send sense control signals 68 to cause the display 18 to perform display panel sensing. In response, the display 18 may send display sense feedback 70 that represents digital information relating to the operational variations of the display 18. The display sense feedback 70 may be input to the aging/temperature determination circuitry 56, and take any suitable form. Output of the aging/temperature determination circuitry 56 may take any suitable form and be converted by the image correction circuitry 52 into a compensation value that, when applied to the image data 54, appropriately compensates for non-uniformity of the display 18. This may result in greater fidelity of the image data 54, reducing or eliminating visual artifacts that would otherwise occur due to the operational variations of the display 18. In some embodiments, the processor core complex 12 may be part of the driver-integrated circuit 60, and as such, be part of the display 18.

Figure 8:
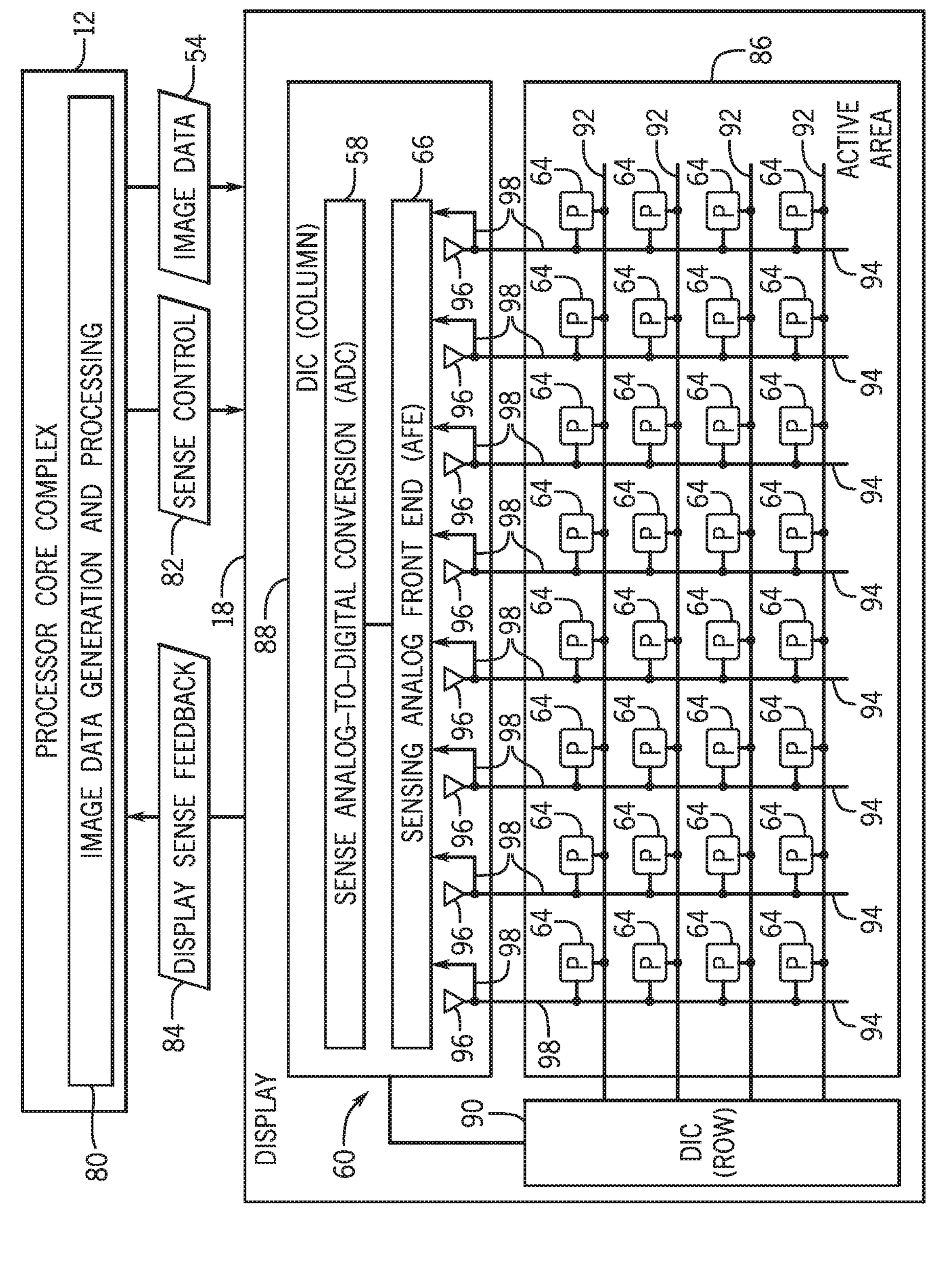
FIG. 8 is a schematic diagram of the system for display sensing and compensation of FIG. 7, according to an embodiment of the present disclosure.

FIG. 8 is a schematic diagram of the system 50 for display sensing and compensation of FIG. 7, according to an embodiment of the present disclosure. The processor core complex 12 may include image data generation and processing circuitry 80 to generate the image data 54 for display by the electronic display 18. The image data generation and processing circuitry 80 represents various circuitry and processing that may be employed by the processor core complex 12 to generate the image data 54 and control the electronic display 18. As such, the image data generation and processing circuitry 80 may include, for example, the image correction circuitry 52 and/or the aging/temperature determination circuitry 56 of FIG. 7. In some embodiments, the image data generation and processing circuitry 80 may include a graphics processing unit, a display pipeline, or the like, to facilitate control of operation of the electronic display 18. The image data generation and processing circuitry 80 may include a processor and memory such that the processor of the image data generation and processing circuitry 80 may execute instructions and/or process data stored in memory of the image data generation and processing circuitry 80 to control operation of the electronic display 18.

To compensate for operational variations of the electronic display 18 due to, for example, temperature variation or aging of the display 18, the processor core complex 12 may provide sense control signals 82 to cause the electronic display 18 to perform display panel sensing and generate display sense feedback 84. The display sense feedback 84 represents digital information relating to the operational variations of the electronic display 18. The display sense feedback 84 may take any suitable form, and may be converted by the image data generation and processing circuitry 80 into a compensation value that, when applied to the image data 54, appropriately compensates for the conditions of the electronic display 18 in the image data 54. This may result in greater fidelity of the image data 54, reducing or eliminating visual artifacts that would otherwise occur due to the operational variations of the electronic display 18.

The electronic display 18 includes an active area 86 with an array of pixels 64. The pixels 64 are schematically shown distributed substantially equally apart and of the same size, but in an actual implementation, pixels of different colors may have different spatial relationships to one another and may have different sizes. In one example, each pixel 64 may have a red-green-blue (RGB) format that includes red, green, and blue pixels or sub-pixels. In another example, the pixels 64 may take a red-green-blue-green (RGBG) format in a diamond pattern. The pixels 64 are controlled by the driver-integrated circuit 60, which may be a single module or may be made up of separate modules, such as a column or source driver-integrated circuit 88 and a row or gate driver-integrated circuit 90. The driver-integrated circuit 60 (e.g., the row driver-integrated circuit 90) may send signals across gate lines 92 (e.g., using gate drivers) to cause a row of pixels 64 to become activated and programmable, at which point the driver-integrated circuit 60 (e.g., the column driver-integrated circuit 88) may transmit image data signals across data lines 94 to program the pixels 64 to display a particular gray level (e.g., individual pixel brightness). By supplying different pixels 64 of different colors with image data 54 to display different gray levels, full-color images may be programmed into the pixels 64. The image data 54 may be driven to an active row of pixels 64 via source drivers 96, which may also be referred to as column drivers.

Regardless of the particular arrangement and layout of the pixels 64, each pixel 64 may be sensitive to changes on the active area 86 of the electronic display 18, such as variations and temperature of the active area 86, as well as the overall age of the pixel 64. Indeed, when each pixel 64 is a light emitting diode (LED), it may gradually emit less light over time. This effect is referred to as aging, and takes place over a slower time period than the effect of temperature on the pixel 64 of the electronic display 18.

As described above, the electronic display 18 may display image frames through control of the luminance of the pixels 64 based on the received image data 54. When a pixel 64 is activated (e.g., via a gate activation signal across a gate line 92 activating a row of pixels 64), luminance of a display pixel 64 may be adjusted by image data 54 received via a data line 94 coupled to the pixel 64. Thus, as depicted, each pixel 64 may be located at an intersection of a gate line 92 (e.g., which may act as, include, or be disposed alongside a scan line) and a data line 94 (e.g., a source line). Based on the received image data 54, the luminance of a display pixel 64 may be adjusted using electrical power supplied from a power source 28, for example, via power a supply lines coupled to the pixel 64.

In some embodiments, to facilitate displaying an image frame, a timing controller may determine and transmit timing data to a gate driver of the row driver-integrated circuit 90 based on the image data 54. For example, in the depicted embodiment, the timing controller may be included in the column driver-integrated circuit 88. The column driver-integrated circuit 88 may receive image data 54 that indicates desired luminance of one or more display pixels 64 for displaying an image frame of the image data 54, analyze the image data 54 to determine the timing data based on the display pixels 64 that the image data 54 corresponds to, and transmit the timing data to the gate driver of the row driver-integrated circuit 90. Based on the timing data, the gate driver may then transmit gate activation signals to activate a row of display pixels 64 via a gate line 92.

As illustrated, the image data generation and processing circuitry 80 may be externally coupled to the electronic display 18. That is, the image data generation and processing circuitry 80 may be included in the processor core complex 12, which is separate from but communicatively coupled to the electronic display 18 and the driver-integrated circuit 60 (including the column driver-integrated circuit 88 and the row driver-integrated circuit 90) of the electronic display 18. Advantageously, the image data generation and processing circuitry 80 may be modular from the display 18 and conveniently updated and/or replaced (e.g., compared to if it were integrated in the display 18). Moreover, in cases where the system 50 is part of a component-dense electronic device 10 (such as the handheld devices 10B-C or the wearable electronic device 10E) that would place a display-integrated image data generation and processing circuitry in close proximity to (e.g., underlying) the pixels 64, heat generated from the image data generation and processing circuitry 80 may combine or intermix with the heat generated from the pixels 64, which may result in inaccurate temperature measurements of the pixels 64. However, in other embodiments, the image data generation and processing circuitry 80 may be part of the display 18.

Display panel sensing may be used to obtain the display sense feedback 84, which may enable the processor core complex 12 to generate compensated image data 54 to negate the effects of temperature, aging, and other variations of the active area 86. The driver-integrated circuit 60 (e.g., the column driver-integrated circuit 89) may include the sensing analog front end (AFE) 66 to perform analog sensing of the response of pixels 64 to test data (e.g., test image data) or user data (e.g., user image data). It should be understood that further references to test data or test image data in the present disclosure include test data and/or user data. The analog signal may be digitized by sensing analog-to-digital conversion circuitry (ADC) 58.

For example, to perform display panel sensing, the electronic display 18 may program one of the pixels 64 with test data (e.g., having a particular reference voltage or reference current). The sensing analog front end 66 then senses (e.g., measures, receives, etc.) at least one value (e.g., voltage, current, etc.) along sense line 98 connected to the pixel 64 that is being tested. Here, the data lines 94 are shown to act as extensions of the sense lines 98 of the electronic display 18. In other embodiments, however, the display active area 86 may include other dedicated sense lines 98 or other lines of the display 18 (e.g., such as the gate or scan lines 92) may be used as sense lines 98 instead of the data lines 94. In some embodiments, other pixels 64 that have not been programmed with test data may be also sensed at the same time a pixel 64 that has been programmed with test data is sensed. Indeed, by sensing a reference signal on a sense line 98 when a pixel 64 on that sense line 98 has not been programmed with test data, a common-mode noise reference value may be obtained. This reference signal can be removed from the signal from the test pixel 64 that has been programmed with test data to reduce or eliminate common mode noise.

The analog signal may be digitized by the sensing analog-to-digital conversion circuitry 58. The sensing analog front end 66 and the sensing analog-to-digital conversion circuitry 58 may operate, in effect, as a single unit. The driver-integrated circuit 60 (e.g., the column driver-integrated circuit 88) may also perform additional digital operations to generate the display sense feedback 84, such as digital filtering, adding, or subtracting, to generate the display sense feedback 84, or such processing may be performed by the processor core complex 12.

Figure 9:
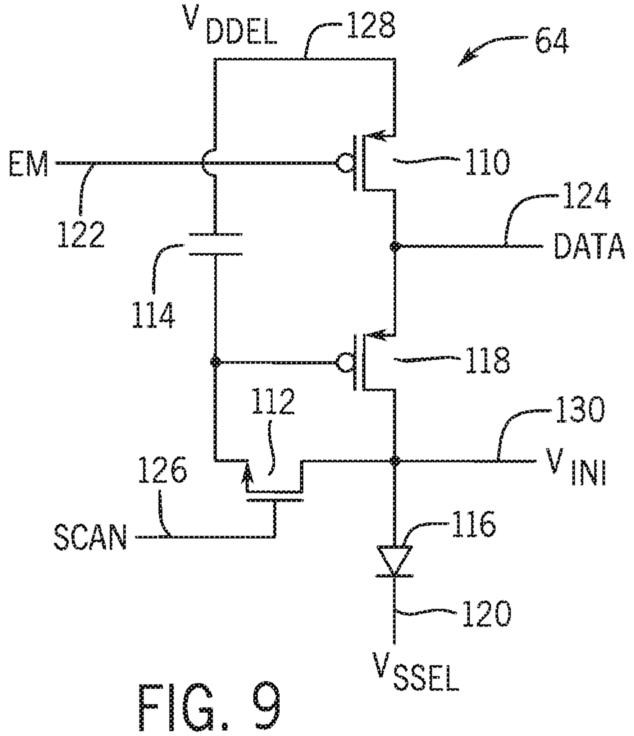
FIG. 9 is a circuit diagram of a display pixel of a display of the electronic device of FIG. 1, according to embodiments of the present disclosure.

FIG. 9 is a circuit diagram of a display pixel 64 of the electronic display 18 of the electronic device 10 of FIG. 1, according to embodiments of the present disclosure. Each pixel 64 may include a first circuit-switching thin-film transistor (TFT) 110, a second circuit-switching TFT 112, a storage capacitor 114, a diode 116 (e.g., an OLED), and a driver TFT 118. Each of the storage capacitor 114 and the diode 116 may be coupled to any suitable negative or ground power supply voltage, $V_{SSEL}$ 120. That is, the negative power supply voltage, $V_{SSEL}$ 120 (which may be provided by a voltage rail in the display panel 62 and supplied by the driver-integrated circuit 60), may provide between 0 and, for example, −100 Volts (V), such as a voltage of zero, −1 V, −2 V, −4 V, −6 V, or any other suitable negative or ground voltage. While $V_{SSEL}$ 120 is referred to as a negative or ground power supply voltage, it should be understood this is with respect to the positive power supply voltage $V_{DDEL}$ 128. As such, in some cases, $V_{SSEL}$ 120 may be positive, as long as it provides a voltage that is less than $V_{DDEL}$ 128. For example, if $V_{DDEL}$ 128 is 4 V, then $V_{SSEL}$ 120 may be 2 V. Moreover, variations may be utilized in place of the illustrated pixel 64. For example, FIG. 9 illustrates the first circuit-switching TFT 110 and the driver TFT 118 as p-channel metal-oxide-semiconductor (PMOS) TFTs. However, in some embodiments, the first circuit-switching TFT 110 and/or the driver TFT 118 may be n-channel metal-oxide-semiconductor (NMOS) TFTs. Similarly, FIG. 9 illustrates the second circuit-switching TFT 112 as an NMOS TFT, though, in some embodiments, the second circuit-switching TFT 112 may be a PMOS TFT.

To facilitate adjusting luminance and operating the diode 116, the first circuit-switching TFT 110, the second circuit-switching TFT 112, and the driver TFT 118 may each serve as a switching device that may couple to or decouple from other circuits and be controllably turned on and off by voltage applied to their respective gates. In the depicted embodiment, the gate of the first circuit-switching TFT 110 is electrically coupled to a gate line 122. Accordingly, when a gate activation signal (e.g., an emission voltage EM which may be provided by a voltage rail in the display panel 62 and supplied by the driver-integrated circuit 60) received from the gate line 122 is below a threshold voltage, the first circuit-switching TFT 110 may turn on, thereby activating the pixel 64 and charging the storage capacitor 114 with image data received at data line 124. When the gate activation signal received from the gate line 122 is above the threshold voltage, the first circuit-switching TFT 110 may turn off, thereby deactivating the pixel 64 and ceasing charging of the storage capacitor 114 with the image data received at the data line 124. The signal received by the driver TFT 118 from the data line 124 may be referred to as a $V_{GS}$ signal, since it is received between the gate and the source of the driver TFT 118.

Additionally, in the depicted embodiment, the gate of the driver TFT 118 is electrically coupled to the storage capacitor 114. As such, voltage of the storage capacitor 114 may control operation of the driver TFT 118. More specifically, in some embodiments, the driver TFT 118 may be operated in an active region to control magnitude of supply current flowing through the diode 116, such as from a power supply providing positive supply voltage $V_{DDEL}$ 128. That is, the positive power supply voltage, $V_{DDEL}$ 128 (which may be provided by a voltage rail in the display panel 62 and supplied by the driver-integrated circuit 60), may provide between 0 and, for example, 100 V, such as a voltage of zero, 1 V, 2 V, 4 V, 6 V, or any other suitable positive voltage (relative to the negative or ground power supply voltage, $V_{SSEL}$ 120). In other words, as gate voltage (e.g., storage capacitor 114 voltage) increases above a threshold voltage, the driver TFT 118 may increase the amount of its channel available to conduct electrical current, thereby increasing supply current flowing to the diode 116. On the other hand, as the gate voltage decreases while still being above the threshold voltage, the driver TFT 118 may decrease the amount of its channel available to conduct electrical current, thereby decreasing supply current flowing to the diode 116. The luminance of the diode 116 is dependent on the amount of current flowing through the diode 116. In this manner, the luminance of the pixel 64 may be controlled and, when similar techniques are applied across the display 18 (e.g., to the pixels 64 of the display 18), an image may be displayed.

As illustrated, the gate of the second circuit-switching TFT 112 is electrically coupled to a scan line 126. Accordingly, when a gate activation signal (e.g., a scan voltage provided by a voltage rail in the display panel 62 and supplied by the driver-integrated circuit 60) received from the scan line 126 is above a threshold voltage, the second circuit-switching TFT 112 may be turned on to supply an initialization or suppression voltage $V_{INI}$ 130 to the storage capacitor 114 to assist in turning off the diode 116 when it is not in use or when it is deactivated. In particular, $V_{INI}$ 130 may be supplied to the storage capacitor 114 to reverse bias the diode 116. As such, the initialization voltage $V_{INI}$ 130 may be any suitable voltage that assists in turning off the diode 116 and/or reverse biases the diode 116, such as a negative voltage of between −1 V and, for example, −12 V, such as −1 V or −2 V. Supplying the initialization voltage $V_{INI}$ 130 to the storage capacitor 114 and thus the diode 116 may improve pixel response time and/or reduce lateral leakage current from the pixel 64. When the gate activation signal received from the scan line 126 is below the threshold voltage, the second circuit-switching TFT 112 may turn off, thereby ceasing charging of the storage capacitor 114 with the initialization voltage $V_{INI}$ 130.

However, an oxide TFT, such as the first circuit-switching TFT 110, the second circuit-switching TFT 112, and/or the driver TFT 118, may undergo a threshold shift as the oxide TFT ages. That is, the threshold voltage of, for example, the second circuit-switching TFT 112, that is compared to the gate activation signal received from the scan line 126 to determine whether to turn the second circuit-switching TFT 112 on or off, may shift or change, which may result in inaccurate and/or inconsistent threshold comparison results, possibly leading to undesirable image artifacts displayed by the pixel 64. As such, to properly operate the oxide TFTs (e.g., 110, 112, 118) and display image data using the pixel 64, the processor core complex 12 may sense or receive these threshold shifts and compensate for them.

Moreover, the rate at which the oxide TFT ages may vary with or be dependent upon temperature. That is, a pixel 64 may age faster when experiencing a higher temperature when compared to a pixel 64 experiencing a lower temperature. And while it may be ideal to sense each pixel 64 of the display 18, doing so may be unrealistic due to a lack of processing power and/or time. On the other hand, sensing a single pixel 64 that would be representative of the entire display 18 may be inaccurate, as temperature variations of gradients often are applied to a region or group of contiguous pixels 64 (e.g., in the case of a fingertip being the source of body heat to a group of pixels 64, a component disposed underneath a group of pixels 64, and so on). As such, sensing for a display 18 may be more realistically and/or accurately performed using a grid-based technique (e.g., for a region or group of contiguous pixels 64). That is, the pixels 64 of the display 18 may be grouped into regions. For each region of pixels 64 (e.g., a 4 pixel by 4 pixel (4×4 pixel) group, a 6×8 pixel group, a 8×10 pixel group, a 16×20 pixel group, or any other suitable size pixel group), a current may be sensed for a representative pixel 64, which may capture an effect of aging on the representative pixel 64 and/or components (e.g., the TFTs 110, 112, 118) of the pixel 64, that may apply to the region of pixels 64. While the remainder of the present disclosure discusses sensing of the pixel 64 in terms of sensing current, it should be understood that the presently disclosure techniques may be similarly applied to sensing other operational characteristics of the pixel 64, such as voltage.

As such, to compensate for operational variations, such as aging, for a region of pixels 64, the processor core complex 12 may instruct the driver-integrated circuit 60 to apply a test voltage to a driver TFT 118 via a data line 124 of a representative pixel 64 of the region of pixels 64, and sense the resulting current (e.g., across the driver TFT 118 or across the diode 116 of the pixel 64). A predetermined current-voltage relationship (determined at an initial temperature and age (e.g., initial conditions) of the pixel 64 (e.g., at a manufacturing facility of the display 18) may be stored in the local memory 14 and/or the main memory storage device 16. Using the predetermined current-voltage relationship, the processor core complex 12 may determine a predetermined voltage that supplies the same resulting current (e.g., to the driver TFT 118 or the diode 116). The processor core complex 12 may then determine a voltage difference between the test voltage and the predetermined voltage for the region of pixels 64. This voltage difference may compensate for operational variations (e.g., aging) of the pixels 64 in the region. The processor core complex 12 may store these voltage differences in a voltage difference lookup table or map (e.g., in the local memory 14 and/or the main memory storage device 16) to be applied when displaying image data 54. That is, when it is desired for a diode 116 of a pixel 64 of the region of pixels 64 to emit light of a target luminance corresponding to the resulting current, the processor core complex 12 and/or the driver-integrated circuit 60 may apply a voltage equal to the sum of the predetermined voltage for that pixel 64 and the voltage difference, thereby compensating for operational variations (e.g., aging) of the pixel 64.

Due to the length of time it may take to perform the sensing (e.g., for a number of pixels 64 of the display 18) and more controlled or stable conditions, the sensing may be performed while the display 18 is off (e.g., during "off-time" of the display 18). While "off-time" may include when the display 18 is unpowered (e.g., the electronic device 10 is turned off), "off-time may also include when the display 18 is powered but not actively being used. This may include such times as when the electronic device 10 is not being used by a user (e.g., for a threshold amount of time), when the electronic device 10 is charging (e.g., plugged in), at a time associated with a pattern of not being used (e.g., between 3 AM and 5 AM), and so on. When the sensing is being performed, it may be desirable that emission of light from the diode 116 is prevented (such that a user of the electronic device 10 may not notice that current sensing is being performed). With this in mind, the presently disclosed systems and methods may also support immediate exit from off-time sensing when there is an indication that image data should be displayed (e.g., the user picks up the electronic device 10 and starts using it).

Moreover, to operate at higher efficiency while providing these features, power provided to the pixel 64 via, for example, the driver-integrated circuit 60, may be reduced. In particular, the voltage difference between the positive supply voltage, $V_{DDEL}$ 128, and the negative power supply voltage, $V_{SSEL}$ 120, provided to the pixel 64 may be minimized or reduced, such as by reducing it to 1 V. For example, the driver-integrated circuit 60 may provide 1 V to the voltage rail supplying the positive supply voltage, $V_{DDEL}$ 128, to the pixel 64, and provide 0 V to the voltage rail supplying the negative power supply voltage, $V_{SSEL}$ 120, to the pixel 64. Additionally, the emission voltage EM provided on the gate line 122 to the pixel 64 and the scan voltage provided by the scan line 126 may be minimized or reduced. For example, the driver-integrated circuit 60 may provide −1 V to the voltage rail supplying the emission voltage EM provided on the gate line 122 to the pixel 64, and provide −1 V to the voltage rail supplying the scan voltage provided by the scan line 126.

In some cases, a pixel 64 may inadvertently retain the image data most recently programmed in it (e.g., exhibiting hysteresis in, for example, the driver TFT 118). Because this hysteresis may result in inaccurate current sensing at the pixel 64, the processor core complex 12 may cause the driver-integrated circuit 60 to reduce the hysteresis in components of the pixel 64 (such as the driver TFT 118) for more accurate current sensing and more effective compensation. As such, the driver-integrated circuit 60 may perform hysteresis reduction on the pixel 64 prior to sensing current at (the driver TFT 118 or the diode 116 of) the pixel 64 (and during off-time of the display 18). Moreover, after performing hysteresis reduction on the pixel 64, the threshold voltage of the driver TFT 118 may have settled to a voltage that, if used to sense current from, may result in inaccurate current sensing. As such, the processor core complex 12 may cause the driver-integrated circuit 60 to settle the threshold voltage of the driver TFT 118 to a proper settling voltage prior to sensing current. While the remainder of the specification discusses settling the threshold of the driver TFT 118, it should be understood that the driver-integrated circuit 60 may additionally or alternatively settle the threshold voltages of the circuit-switching TFTs 110, 112 to avoid threshold shifting and possible inaccurate current sensing.

Figure 10:
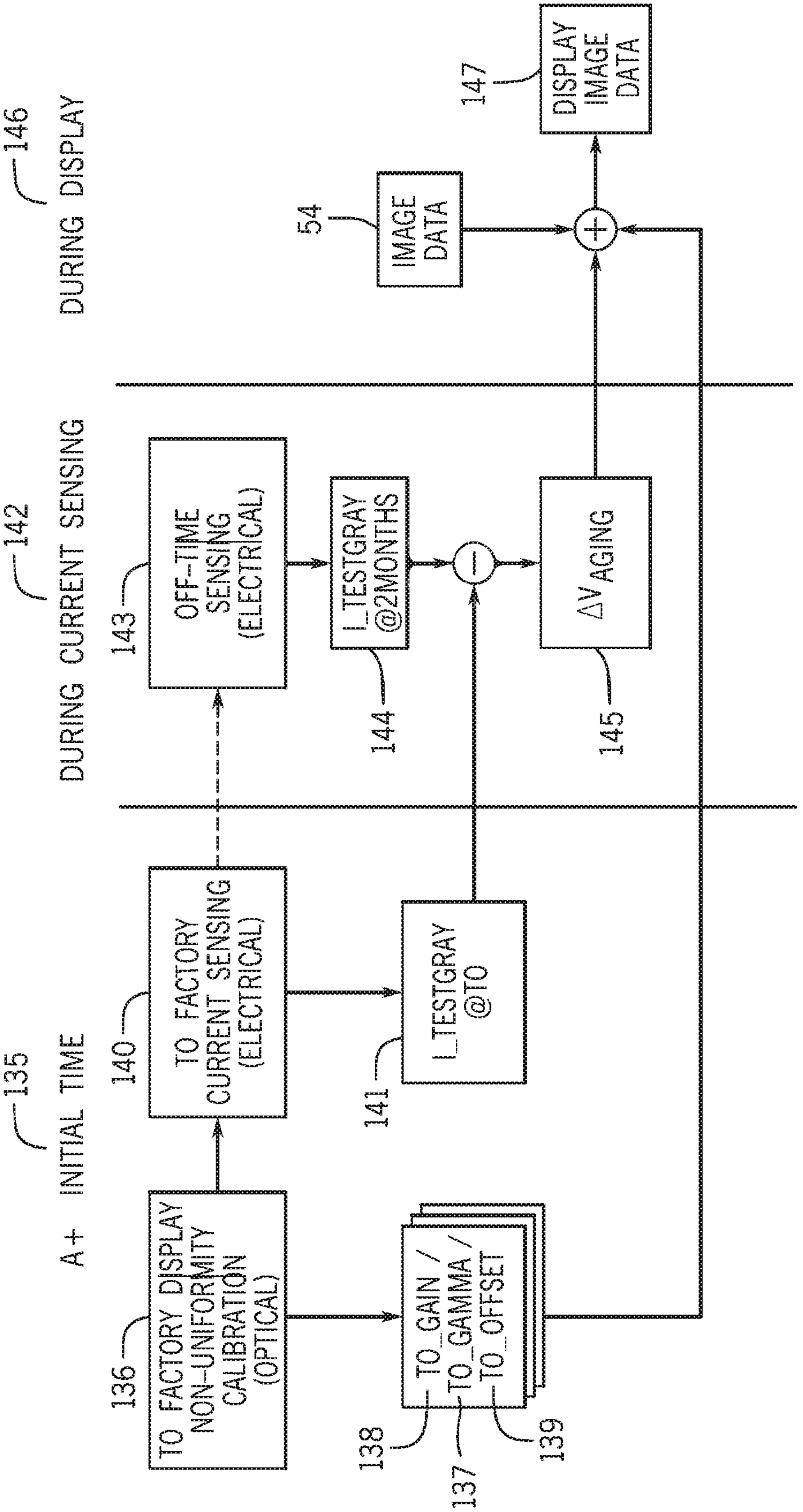
FIG. 10 is a block diagram of predetermined lookup tables used to compensate for operational variations of the display of the electronic device of FIG. 1, according to embodiments of the present disclosure.

In some embodiments, multiple predetermined lookup tables or maps may be determined at the initial conditions of the display 18 (e.g., at an initial temperature and age), and the processor core complex 12 may use the predetermined lookup tables or maps to determine the voltage difference map and/or apply the voltage difference map to compensate for present operational variations of the display 18. For example, FIG. 10 is a block diagram of predetermined lookup tables used to compensate for operational variations of the display 18 of the electronic device 10 of FIG. 1, according to embodiments of the present disclosure.

At an initial time period 135, such as at the factory or manufacturing facility where the displays 18 are made or assembled, initial (e.g., T0) factory display non-uniformity calibration 136 may be performed. In particular, the initial factory display non-uniformity calibration 136 may be performed optically, such as by applying different test voltages to the driver TFTs 118 of the pixels 64 and capturing images of the pixels 64 while the respective diodes 116 are emitting the resulting different luminances. An initial gamma lookup table 137 may be generated from the initial factory display non-uniformity calibration 136 that stores gamma or brightness values of each diode 116 of each pixel 64 and gamma voltage values that cause the pixel 64 to emit the corresponding gamma values. An initial gain lookup table 138 may also be generated that stores gain voltage values to add to the gamma voltage values in the initial gamma lookup table 137 so that diodes 116 that were emitting dimmer luminances than desired may emit the proper luminances. Similarly, an initial offset lookup table 139 may be generated that stores offset voltage values to subtract from the gamma voltage values in the initial gamma lookup table 137 so that diodes 116 that were emitting brighter luminances than desired may emit the proper luminances.

Additionally, initial factory current sensing 140 may be performed. In particular, different test voltages may be applied to the driver TFTs 118 of the pixels 64 and current may be sensed at the driver TFTs 118 or the diodes 116. The test voltages and currents may be stored in an initial current-voltage lookup table 141 (e.g., "I_TestGray @T0").

During a current sensing period 142, off-time current sensing 143 may be performed. In particular, the processor core complex 12 may cause the driver-integrated circuit 60 to perform hysteresis reduction, threshold voltage settling, and current sensing. The processor core complex 12 may store the test voltages applied and resulting sensed currents in a present current-voltage lookup table 144 (e.g., "I_TestGray @2months"). The processor core complex 12 may thus determine the voltage differences between voltages applied in the initial current-voltage lookup table 141 and the present current-voltage lookup table 144 (for each corresponding current), and store them in a voltage difference lookup table 145 (e.g., "$\Delta V_{aging}$"). In some embodiments, the present current-voltage lookup table 144 may not include current and voltage values for each pixel 64, but instead may include current and voltage values for each representative pixel 64 of a region of pixels 64 of the display 18. As such, for each pixel 64 of each region of pixels 64, the processor core complex 12 may determine a voltage difference between voltages applied in the initial current-voltage lookup table 141 associated with a respective pixel 64 and the present current-voltage lookup table 144 associated with a respective representative pixel 64 in the respective region of pixels 64 that includes the respective pixel 64 (for each corresponding current) to generate the voltage difference lookup table 145.

During a display period 146, the processor core complex 12 may receive the image data 54 to be displayed, the gamma lookup table 137, the gain lookup table 138, the offset lookup table 139, and the voltage difference lookup table 145. The processor core complex 12 may then display 147 the image data 54 by, for each pixel 64, receiving or determining a target luminance value for the pixel 64 from the image data 54, receiving or determining a gamma voltage value to apply at the driver TFT 118 of the pixel 64 to cause the diode 116 of the pixel 64 to emit light of the target luminance value as provided by the gamma lookup table 137, receiving or determining a gain voltage value as provided by the gain lookup table 138 and/or receiving or determining an offset voltage value as provided by the offset lookup table 139 corresponding to the target luminance value (or the gamma voltage value), receiving or determining a voltage difference value from the voltage difference lookup table 145, and applying the sum of the gamma voltage value, the gain voltage value or the offset voltage value, and the voltage difference value to the driver TFT 118 of the pixel 64. In this manner, the processor core complex 12 may use the predetermined lookup tables to determine the voltage difference lookup table 145 and/or apply the voltage difference lookup table 145 to compensate for present operational variations of the display 18.

Figure 11:
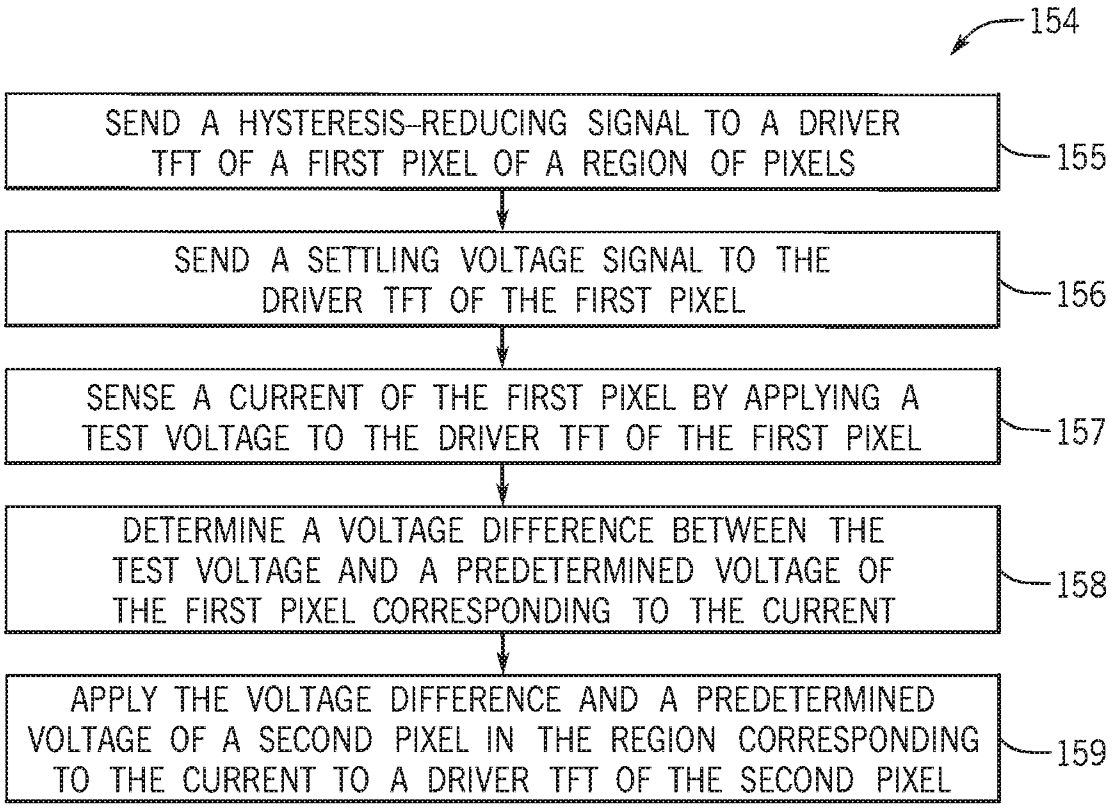
FIG. 11 is process for externally compensating for operational variations of the display of the electronic device of FIG. 1, according to embodiments of the present disclosure.

With this in mind, FIG. 11 is process 154 for externally compensating for operational variations (e.g., aging) of the display 18 of the electronic device 10 of FIG. 1, according to embodiments of the present disclosure. The process 154 may be repeated for multiple pixels 64 to determine multiple target voltages to be applied at respective driver TFTs 118 of the multiple pixels 64 to compensate for operational variations of each of the multiple pixels 64. While the process 154 is described using steps in a specific sequence, it should be understood that the present disclosure contemplates that the describe steps may be performed in different sequences than the sequence illustrated, and certain described steps may be skipped or not performed altogether. In some embodiments, the process 154 may be implemented by executing instructions stored in a tangible, non-transitory, computer-readable medium, such as the local memory 14 and/or the main memory storage device 16, using a processor, such as the processor core complex 12, and, in particular, the image correction circuitry 52 and/or the aging/temperature determination circuitry 56 of the processor core complex 12 shown in FIG. 7. In alternative or additional embodiments, the process 154 may be implemented by the processor causing or instructing components of the display 18, such as the driver-integrated circuit 60, to carry out instructions.

As illustrated, in process block 155, the processor core complex 12 causes the driver-integrated circuit 60 to send a hysteresis-reducing signal to the driver TFT 118 of a first pixel 64 in a region of pixels 64. In particular, the driver-integrated circuit 60 may send the hysteresis-reducing signal to the data line 124 of the first pixel 64. The hysteresis-reducing signal may be part of the image data 54 and/or the sense control signals 82 sent by the processor core complex 12. In some embodiments, the hysteresis-reducing signal may be a fixed value (e.g., a fixed bias voltage level or value) while, in other embodiments, the hysteresis-reducing signal may be a waveform that has a voltage level or value that varies. Using a fixed value as the hysteresis-reducing signal may have power advantages for the electronic device 10 since, for example, one or more of the portions of the device, such as the processor core complex 12, may shut down and/or may be placed into a sleep mode to save power while, for example, the driver-integrated circuit 60 may continue operation.

Figure 12:
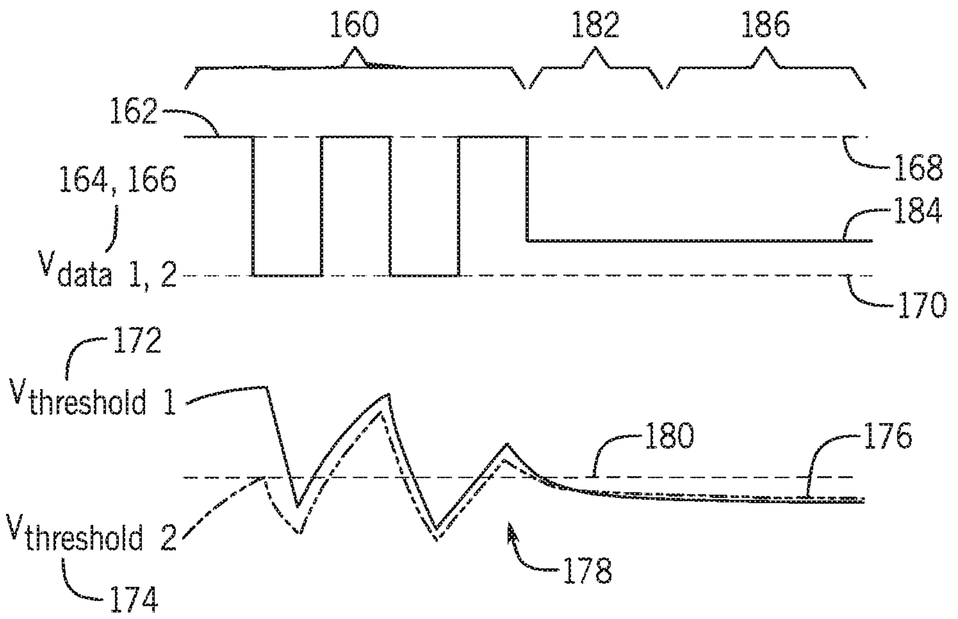
FIG. 12 is a timing diagram of data voltages applied to two pixels of the display of the electronic device of FIG. 1 and resulting threshold voltages of the two pixels over time, according to embodiments of the present disclosure.

FIG. 12 is a timing diagram of data voltages applied to two pixels 64 of a display 18 of the electronic device 10 of FIG. 1 and resulting threshold voltages of the two pixels 64 over time, according to embodiments of the present disclosure. A first portion of the timing diagram illustrates the hysteresis reduction process 160 performed by the processor core complex 12 and/or the driver-integrated circuit 60 in process block 155. In particular, the driver-integrated circuit 60 may apply the hysteresis-reducing signal 162 (illustrated in the form of a waveform) as data voltages 164, 166 to the sources of the driver TFTs 118 of the two pixels 64 via respective data lines 124. The hysteresis-reducing signal 162 alternates between a high voltage value 168 and a low voltage value 170 to reduce or rid the driver TFTs 118 of the previous charge or image data recently programmed in the driver TFTs 118. The high voltage value 168 and the low voltage value 170 may be any suitable voltage values that enable the driver TFTs 118 to settle quickly and thus reduce hysteresis, such as, respectively, 1 V and 0 V, 2 V and 0 V, 1 V and −1 V, and so on. The hysteresis reduction process 160 may be performed in any suitable amount of time, such as between 30 seconds and 10 minutes, including 4 minutes, 5 minutes, 6 minutes, and so on.

Prior to applying the hysteresis-reducing signal 162, the threshold voltages 172, 174 of the driver TFTs 118 of the two pixels 64 may not be the same, and may not have settled to a settling voltage 176, which may cause inaccurate current sensing. As illustrated, after applying the hysteresis-reducing signal 162, at time 178, the threshold voltages 172, 174 of the driver TFTs 118 have quickly settled and are approximately the same. That is, without applying the hysteresis-reducing signal 162, the threshold voltages 172, 174 of the driver TFTs 118 may have settled, but taken more time to settle. However, as illustrated, at time 178, the threshold voltages 172, 174 of the driver TFTs 118 have settled to a voltage 180 different from the settling voltage 176, which may be cause inaccurate current sensing.

Turning back to FIG. 11, in process block 156, the processor core complex 12 causes the driver-integrated circuit 60 to send a settling voltage signal (e.g., to cause the settling voltage 176 to be supplied) to the driver TFT 118 of the first pixel 64. In particular, the settling voltage signal may supply the settling voltage 176 at the data line 124 of the first pixel 64. The settling voltage 176 may be any suitable voltage that may result in accurate current sensing. In some embodiments, the settling voltage may correspond to a luminance, brightness, or grey level or value of the first pixel 64. For example, current sensing may be accurate when the voltage supplied to the source of the driver TFT 118 from the data line 124 and/or the threshold voltage of the driver TFT 118 corresponds to a grey level of 31. As illustrated in FIG. 12, a second portion f the timing diagram illustrates the settling voltage process 182 of applying the settling voltage 184 to the sources of the driver TFTs 118 of the two pixels 64 from respective data lines 124. The settling voltage process 182 may be performed in any suitable amount of time, such as between 10 seconds and 10 minutes, including 90 seconds, 120 seconds, 150 seconds, and so on. As a result, the threshold voltages 172, 174 of the driver TFTs 118 have settled to the settling voltage 176, where current sensing may produce accurate results.

Turning back to FIG. 11, in process block 157, the processor core complex 12 causes the driver-integrated circuit 60 to sense a current of the first pixel 64 by applying a test voltage to the driver TFT 118 of the first pixel 64. In particular, the driver-integrated circuit 60 senses the current after reducing hysteresis in the driver TFT 118 (from process block 155) and applying the settling voltage 184 (from process block 156) to ensure accurate current sensing. The processor core complex 12 may cause driver-integrated circuit 60 to apply the test voltage to the driver TFT 118 via the data line 124, and sense the current across the driver TFT 118 or the diode 116. A third portion of the timing diagram of FIG. 12 illustrates the current sensing process 186 during which the driver-integrated circuit 60 may apply the test voltage and sense the current across the driver TFT 118 for accurate results. The current sensing process 186 may be performed in any suitable amount of time, such as between 10 seconds and 10 minutes, including 90 seconds, 120 seconds, 150 seconds, and so on.

Turning back to FIG. 11, in process block 158, the processor core complex 12 determines a voltage difference between the test voltage and a predetermined voltage of the first pixel 64 corresponding to the current. In particular, a predetermined current-voltage relationship (determined at an initial temperature and age (e.g., initial conditions) of the pixel 64 (e.g., at a manufacturing facility of the display 18) may be stored in the local memory 14 and/or the main memory storage device 16. Using the predetermined current-voltage relationship, the processor core complex 12 may determine a predetermined voltage that supplies the current at (e.g., the driver TFT 118 or the diode 116 of) the first pixel 64. The processor core complex 12 may then subtract the predetermined voltage from the test voltage to determine the voltage difference. This voltage difference may compensate for operational variations (e.g., aging) of, not only the pixel 64, but also pixels 64 in a region including the pixel 64. The processor core complex 12 may store the voltage difference in a lookup table or map of voltage differences (e.g., in the local memory 14 and/or the main memory storage device 16), such as the voltage difference lookup table 145, that correspond to representative pixels 64 of the regions of the pixels 64 of the display 18.

In process block 159, the processor core complex 12 applies the voltage difference and a predetermined voltage of a second pixel 64 in the region having the first pixel 64 corresponding to the current to a driver TFT 118 of the second pixel 64. That is, it may be desired for a diode 116 of the second pixel 64 to emit light of a target luminance corresponding to the current (sensed in process block 157). The processor core complex 12 may determine the predetermined voltage to apply to the driver TFT 118 to supply the current to the driver TFT 118 or the diode 116 of the second pixel 64 using the predetermined current-voltage relationship (e.g., stored in the local memory 14 and/or the main memory storage device 16). However, because the predetermined current-voltage relationship was determined under initial conditions (e.g., an initial age and temperature of the second pixel 64), the predetermined voltage may not compensate for operational variations with respect to the initial condition (such as aging of the second pixel 64). As such, the processor core complex 12 may apply a sum of the predetermined voltage and the voltage difference to the data line 124 of the second pixel 64 to compensate for the operational variations (e.g., aging) of the second pixel 64.

At least during the time that hysteresis reduction (from process block 155), threshold voltage settling (from process block 156), and sensing currents (from process block 157) occur, it may be desirable to prevent emission of light from the diode 116 (such that a user of the electronic device 10 may not notice that these events are occurring). As such, a number of techniques may be performed to prevent emission of light from the display 18. For example, the processor core complex 12 may adjust the electrical power supplied from the power source 28 to cease transmission of voltage along certain supply lines (although, for example, gate clock generation and transmission may be continued). As another example, the pixel 64 may include a switch that may control light emission from the pixel 64. The processor core complex 12 may send a control signal to the switch to open or close the switch, and thus prevent voltage from being transmitted to the diode 116.

Figure 13:
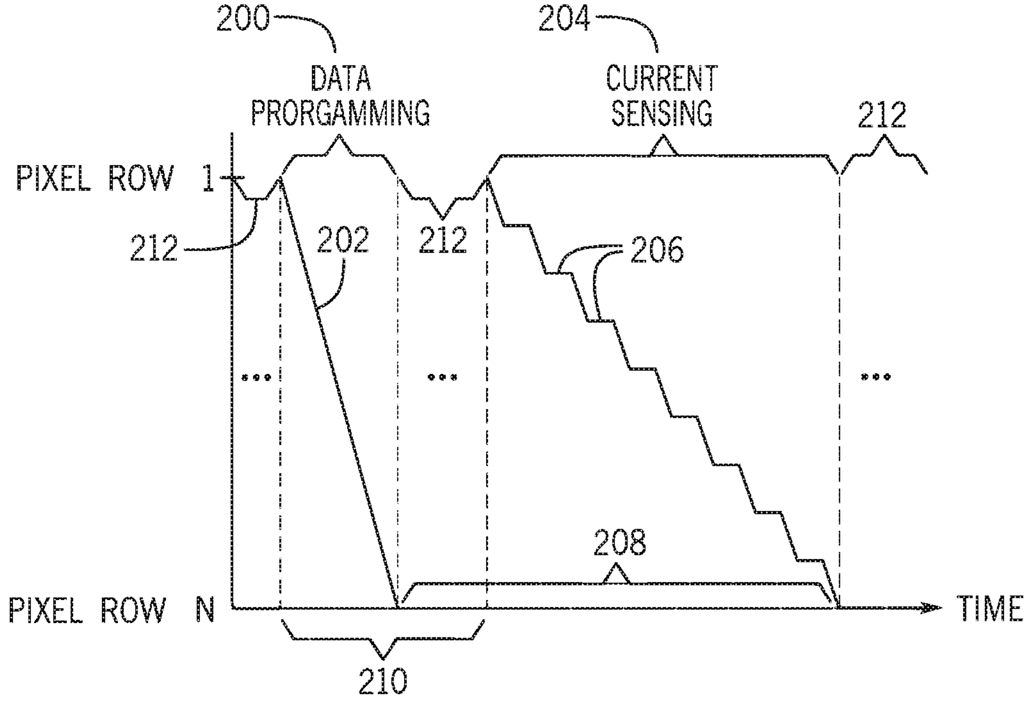
FIG. 13 is a timing diagram illustrating when data may be programmed and current may be sensed for pixels of the display of the electronic device of FIG. 1, according to embodiments of the present disclosure.

Current sensing (e.g., as described in process block 157) may be performed multiple times to cover the display 18. That is for each region of pixels 64 of the display 18, the processor core complex 12 may cause the driver-integrated circuit 60 to sense current for a respective representative pixel 64 of that region of pixels 64. Moreover, in some cases, current for the same representative pixel 64 may be sensed multiple times to improve signal-to-noise ratio, for redundancy purposes (e.g., averaging the multiple currents to filter out outlying data), and so on. FIG. 13 is a timing diagram illustrating when data may be programmed and current may be sensed for pixels 64 of the display 18 of the electronic device 10 of FIG. 1, according to embodiments of the present disclosure. During a data programming period 200, data may be programmed 202 in the pixels 64 (e.g., from pixel row 1 to pixel row N). In particular, during the data programming period 200, the processor core complex 12 may cause the driver-integrated circuit 60 to apply a test voltage to at least the pixels 64 in which current may be sensed (e.g., each representative pixel 64 of the regions of pixels 64).

After the data programming period 200 is complete, during a current sensing time period 204, current may be sensed 206 in certain pixels 64. In particular, during the current sensing time period 204, the processor core complex 12 may cause the driver-integrated circuit 60 to reduce hysteresis in the driver TFTs 118 (from process block 155), settle the threshold voltage in the driver TFTs 118 (from process block 156), and sense current across the driver TFTs 118 or the diodes 116 of each representative pixel 64 of the regions of pixels 64 (from process block 157). In some embodiments, because the data programmed in certain pixels 64 (e.g., pixel row N) remains in those pixels 64 for a time period 208 greater than a time period 210 of data programmed in other pixels 64 (e.g., pixel row 1), the timing of the data programming 202 and/or the current sensing 206 may be adjusted such that the difference in time periods 208, 210 is approximately the same. Moreover, it should be understood that there are gaps 212 in the timing diagram that may be used to perform other functions, such as other display functions or touch functions (e.g., registering, identifying, or locating a touch on the display 18).

In some embodiments, the electronic device 10 may implement an "Always-On" display, such that at least a portion of the display 18 is on during sleep mode. For example, during sleep mode, the display 18 may display an Always-on image that provides certain information that may be interesting or useful to the user, such as the time, date, battery status, notifications, screensavers, and so on. To support the Always-On display, the electronic device 10 and/or the display 18 may include multiple power planes. The Always-On image may be displayed on different power planes at different times, such that off-time sensing (including reducing hysteresis and settling the threshold voltage in the driver TFT 118) may be performed on a power plane that is not displaying the Always-On image. For example, the Always-On image may be sequentially rotated among the power planes (e.g., displayed on a first power plane but not the other power planes for a time period, displayed on a second power plane but not the other power planes for the time period, and so on). The sleep mode may be a low power mode of the display 18 and/or device 10 in which certain components of the display 18 and/or device 10 may consume less power and/or be turned off completely to save power.

Figure 14:
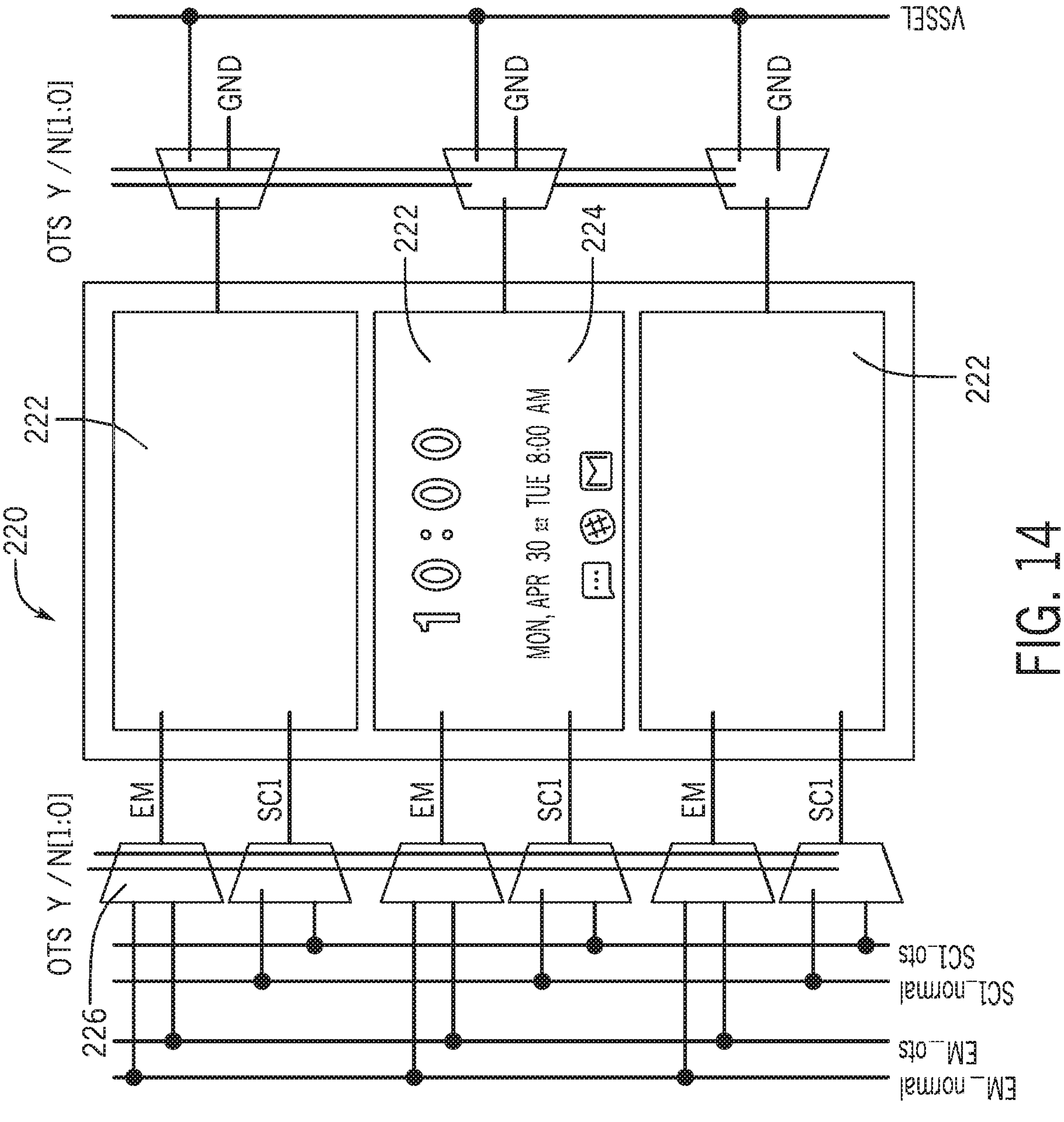
FIG. 14 is a schematic diagram of a first implementation of power rail architecture supporting an Always-On display of the electronic device of FIG. 1, according to embodiments of the present disclosure.
Figure 15:
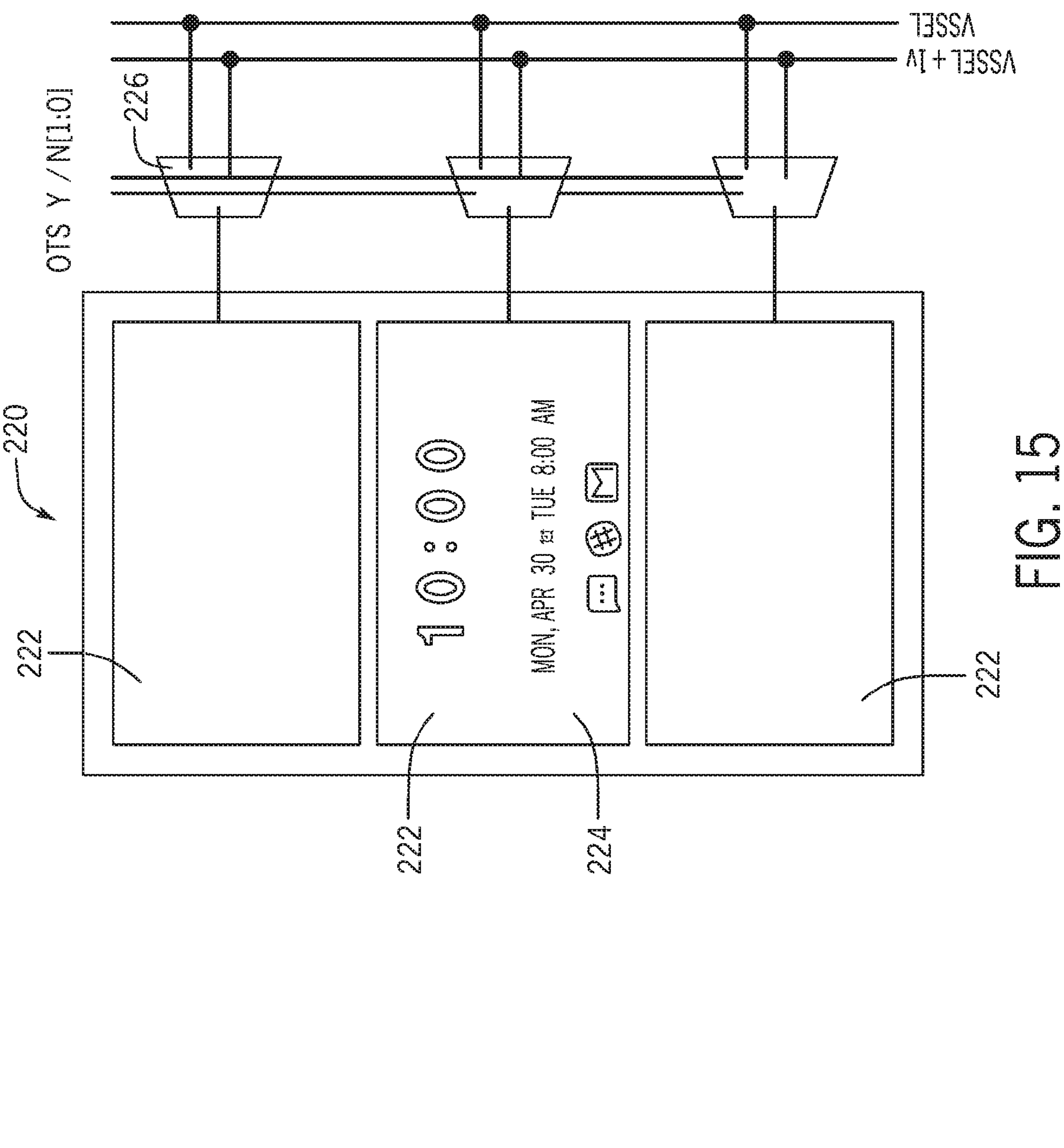
FIG. 15 is a schematic diagram of a second implementation of power rail architecture supporting an Always-On display of the electronic device of FIG. 1, according to embodiments of the present disclosure.

FIGS. 14 and 15 are schematic diagrams of implementations of power rail architecture supporting an Always-On display 220 of the electronic device 10 of FIG. 1, according to embodiments of the present disclosure. As illustrated, the Always-On display 220 includes three power planes 222, but any suitable number of power planes (e.g., 2-100 power planes, 5-10 power planes, and so on) is contemplated to support the Always-On display 220. The processor core complex 12 displays the Always-On image 224 on the second or middle power plane 222, and, as such, the processor core complex 12 may perform off-time sensing (including causing the driver-integrated circuit 60 to reduce hysteresis and settle the threshold voltage in the driver TFT 118) in the other power planes 222 (e.g., the first or top power plane 222 and the third or bottom power plane 222).

The first implementation shown in FIG. 14 enables providing 0 V to the voltage rail supplying the negative power supply voltage $V_{SSEL}$ 120 of 0, 1 V to the voltage rail supplying the positive supply voltage $V_{DDEL}$ 128 of 1 V, −1 V to the voltage rail supplying the emission voltage EM, and −1 V to the voltage rail supplying the scan voltage, as referred to in pixel diagram FIG. 9. Each power plane 222 may receive a separate emission voltage EM, scan voltage, and negative power supply voltage $V_{SSEL}$ 120 from the illustrated power rails and selection circuitry. Additionally, for each power plane 222, the processor core complex 12 and/or the driver-integrated circuit 60 may select between a normal emission signal ("EM_normal") and an off-time sensing emission signal ("EM_ots"), a normal scan signal ("SC1_normal") and an off-time sensing scan signal ("SC1_ots"), and the $V_{SSEL}$ 120 signal or a ground signal based on a one-bit selection signal input to a respective multiplexer (e.g., 226) indicating whether off-time sensing is being performed ("OTS").

In some cases, it may be desirable to reduce or minimize the amount of space taken up by the power rails and selection circuitry shown in FIG. 14. As such, FIG. 15 illustrates a second implementation of power rail architecture supporting the Always-On display 220. In particular, each power plane 222 may receive a separate negative power supply voltage $V_{SSEL}$ or positive power supply voltage (e.g., $V_{DDEL}=V_{SSEL}+1$) from the illustrated power rails and selection circuitry. That is, for each power plane 222, the processor core complex 12 and/or the driver-integrated circuit 60 may select between the $V_{SSEL}$ 120 signal or the positive power supply voltage based on a one-bit selection signal input to a respective multiplexer (e.g., 226) indicating whether off-time sensing is being performed ("OTS"). The voltage rails supplying the emission voltage EM and the scan voltage may also use the illustrated power rails and selection circuitry, thus reducing the amount of space taken up by the power rails and selection circuitry when compared to the implementation shown in FIG. 13.

As discussed above, hysteresis reduction, threshold voltage settling, and current sensing of the driver TFT 118 may be advantageously performed during off-time of the display 18. Moreover, performance of these processes may be abandoned when the electronic device 10 becomes active (e.g., a user turns on or attempts to use the device 10). These processes may also preferably be performed when the device 10 has sufficient power (e.g., is charging or has sufficient charge in a coupled battery), and when the temperature is sufficiently stable, since temperature changes or gradients may affect the accuracy of current measurements.

Figure 16:
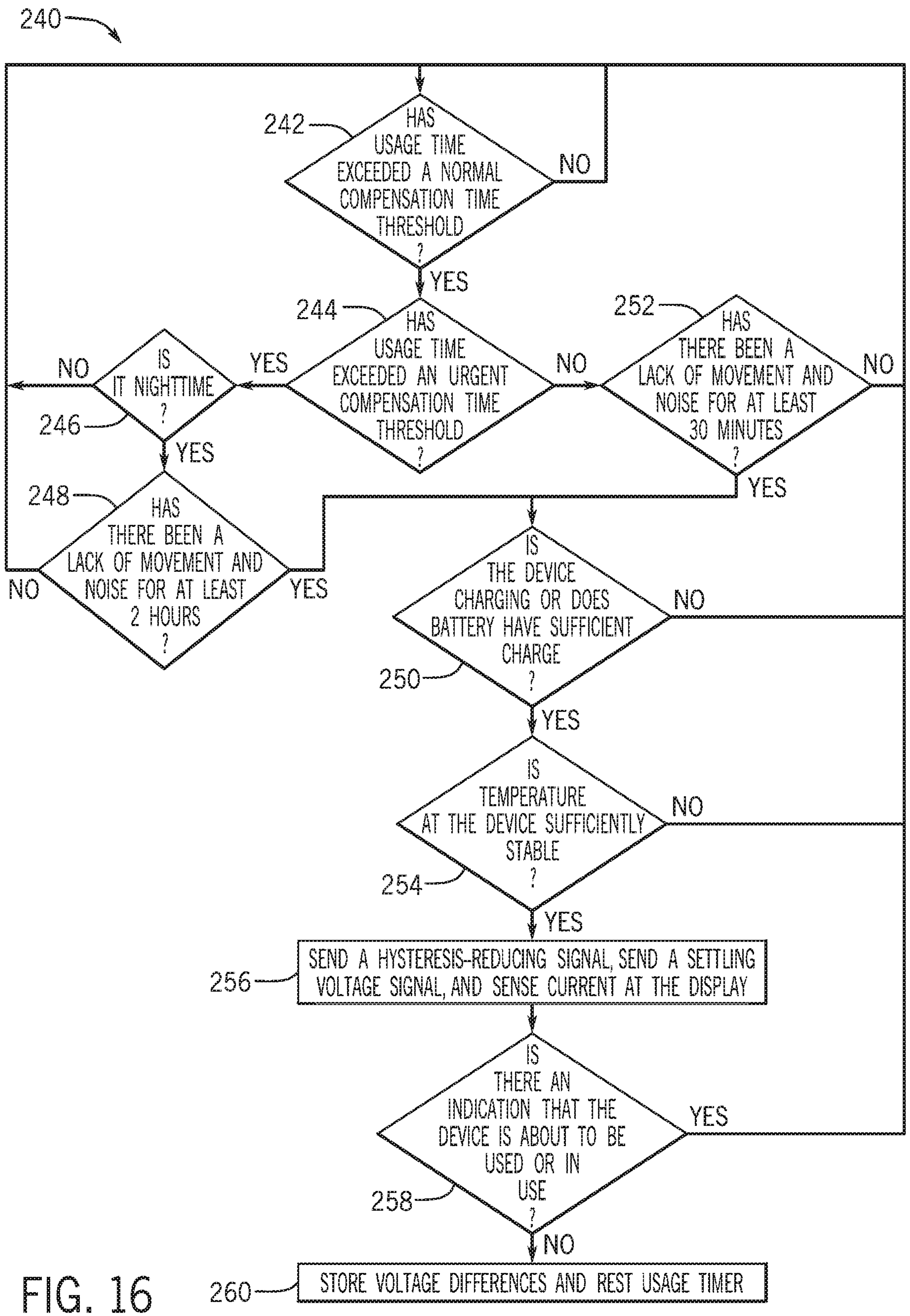
FIG. 16 is process for determining an appropriate time to sense and store voltage differences used to compensate for operational differences of the display of the electronic device of FIG. 1, according to embodiments of the present disclosure.

FIG. 16 is process 240 for determining an appropriate time to sense and store voltage differences used to compensate for operational differences (e.g., aging) of the display 18 of the electronic device 10 of FIG. 1, according to embodiments of the present disclosure. While the process 240 is described using steps in a specific sequence, it should be understood that the present disclosure contemplates that the describe steps may be performed in different sequences than the sequence illustrated, and certain described steps may be skipped or not performed altogether. In some embodiments, the process 240 may be implemented by executing instructions stored in a tangible, non-transitory, computer-readable medium, such as the local memory 14 and/or the main memory storage device 16, using a processor, such as the processor core complex 12, and, in particular, the image correction circuitry 52 and/or the aging/temperature determination circuitry 56 of the processor core complex 12 shown in FIG. 7.

As illustrated, in decision block 242, the processor core complex 12 determines whether a usage time of the display 18 and/or the device 10 has exceeded a normal compensation time threshold. In particular, the processor core complex 12 may control a usage timer that counts the amount of time the display 18 and/or the device 10 has been used after a previous time that the processor core complex 12 sensed and stored voltage differences (e.g., in a lookup table or map stored in the local memory 14 and/or the main memory storage device 16, such as the voltage difference lookup table 145) to compensate for operational differences (e.g., aging) of the display 18. The normal compensation time threshold may be any suitable time period that the processor core complex 12 may refresh or update the voltage difference lookup table 145, such as 1 day, 1 week, 2 weeks, 1 month, 3 months, 6 months, 1 year, and so on.

If the processor core complex 12 determines that the usage time of the display 18 and/or the device 10 has not exceeded the normal compensation time threshold, the processor core complex 12 returns to decision block 242 and repeats. Once the processor core complex 12 determines that the usage time of the display 18 and/or the device 10 has exceeded the normal compensation time threshold, in decision block 244, the processor core complex 12 determines whether the usage time of the display 18 and/or the device 10 has exceeded an urgent compensation time threshold. The urgent compensation time threshold may be any suitable time period that the processor core complex 12 may refresh or update the voltage difference lookup table 145, but may be greater than the normal compensation time threshold. In particular, while the normal compensation time threshold may represent a normal or typical period of time that a refresh of the voltage differences should occur, the urgent compensation time threshold may represent a more urgent or pressing period of time that the refresh of the voltage differences should occur, because the older the voltage differences lookup table 145 is used and not current, the more likely image data displayed on the display 18 using the voltage differences as compensation values may generate undesirable image artifacts. As such, the urgent compensation time threshold may be 1 day, 1 week, 2 weeks, 1 month, 3 months, 6 months, 1 year, and so on, as long as the urgent compensation time threshold is greater than the normal compensation time threshold. For example, in one embodiment, the normal compensation time threshold may be 45 days, while the urgent normal compensation time threshold may be 60 days.

If the processor core complex 12 determines that the usage time of the display 18 and/or the device 10 has exceeded the urgent compensation time threshold, then, in decision block 246, the processor core complex 12 determines whether it is nighttime. In particular, the processor core complex 12 may determine whether the current time is indicative of a lack of use of the display 18 and/or the device 10. For example, the processor core complex 12 may determine whether the time is between 3 AM and 5 AM. In some embodiments, the processor core complex 12 may generate a usage pattern of the display 18 and/or the device 10, and determine whether the current time corresponds to a usage pattern where the display 18 and/or the device 10 is typically not being used. If the processor core complex 12 determines that it is not nighttime, the processor core complex 12 returns to decision block 242 and repeats.

If the processor core complex 12 determines that it is nighttime, in decision block 248, the processor core complex 12 determines whether there has been a lack of movement and noise for at least two hours. In particular, the processor core complex 12 may use sensors (including audio and/or movement sensors) to determine whether the device 10 is in an environment where use of the display 18 and/or the device 10 is unlikely. The lack of movement and/or noise for a period of time may indicate that use of the display 18 and/or the device 10 is unlikely. While two hours is used as a time threshold, any suitable time threshold may be used to determine whether the device 10 is in an environment where use of the display 18 and/or the device 10 is unlikely. If the processor core complex 12 determines that there has not been a lack of movement and noise for at least two hours, then the processor core complex 12 returns to decision block 242 and repeats. If the processor core complex 12 determines that there has been a lack of movement and noise for at least two hours, then, in decision block 250, the processor core complex 12 determines whether the device 10 is charging or whether a battery of the device 10 has sufficient charge (to sense and store an updated voltage differences lookup table 145).

Returning to decision block 244, if the processor core complex 12 determines that the usage time of the display 18 and/or the device 10 has not exceeded the urgent compensation time threshold, then in decision block 252, the processor core complex 12 determines whether there has been a lack of movement and noise for at least 30 minutes. In particular, the processor core complex 12 may use sensors (including auditory and/or movement sensors) to determine whether the device 10 is in an environment where use of the display 18 and/or the device 10 is unlikely. The lack of movement and/or noise for a period of time may indicate that use of the display 18 and/or the device 10 is unlikely. While 30 minutes is used as a time threshold, any suitable time threshold may be used to determine whether the device 10 is in an environment where use of the device 10 is unlikely. If the processor core complex 12 determines that there has not been a lack of movement and noise for at least 30 minutes, then the processor core complex 12 returns to decision block 242 and repeats.

If the processor core complex 12 determines that there has been a lack of movement and noise for at least 30 minutes, then, in decision block 250, the processor core complex 12 determines whether the device 10 is charging (e.g., is plugged in) or whether a battery (e.g., external or internal) of the device 10 has sufficient charge (to sense and store an updated voltage differences lookup table 145). If the processor core complex 12 determines that the device 10 is not charging or that the battery does not have sufficient charge, then the processor core complex 12 returns to decision block 242 and repeats. If the processor core complex 12 determines that the device 10 is charging or that the battery has sufficient charge, then, in decision block 254, the processor core complex 12 determines whether the temperature at the display 18 and/or the device 10 is sufficiently stable. That is, because temperature changes or gradients may affect the accuracy of current sensing, the processor core complex 12 may determine whether the temperature is sufficiently stable to sense current accurately. For example, the processor core complex 12 may determine whether temperature is changing by any suitable threshold amount during the process 240 (e.g., by 0.01 to 20 degrees Celsius, 1 to 10 degrees Celsius, 1 to 5 degrees Celsius, and so on). In one embodiments, the threshold amount may be 1 degree Celsius or 2 degrees Celsius.

If the processor core complex 12 determines that the temperature at the display 18 and/or the device 10 is not sufficiently stable, then the processor core complex 12 returns to decision block 242 and repeats. If the processor core complex 12 determines that the temperature at the display 18 and/or the device 10 is sufficiently stable, then, in process block 256, the processor core complex 12 causes the driver-integrated circuit 60 to sends a hysteresis-reducing signal, sends a settling voltage signal, and sense current at the display 18. In particular, the driver-integrated circuit 60 may send the hysteresis-reducing signal to each driver TFT 118 of each representative pixel 64 of each region of pixels 64 of the display 18 (e.g., as described in process block 155 of FIG. 11), send the settling voltage signal to each driver TFT 118 (e.g., as described in process block 156 of FIG. 11), and sense current across each driver TFT 118 or diode 116 of each representative pixel 64 of each region of pixels 64 of the display 18 (e.g., as described in process block 157 of FIG. 11).

While sending the hysteresis-reducing signal, sending the settling voltage signal, and/or sensing the current at the display 18, in decision block 258, the processor core complex 12 determines whether there is an indication that the display 18 and/or the device 10 is about to be used or in use. For example, the processor core complex 12 may receive an indication (e.g., sensor information) from movement sensors of the electronic device 10 that the device 10 is being picked up, an indication (e.g., an input signal) from an input structure 22 (e.g., an on/off button) that the display 18 and/or the device 10 is being turned on, an indication (e.g., sensor information) from audio sensors that the display 18 and/or the device 10 is being voice-activated, and so on. If the processor core complex 12 determines that there is an indication that the display 18 and/or the device 10 is about to be used or in use, then the processor core complex 12 interrupts the processes of reducing the hysteresis, settling the threshold voltage, and/or sensing the current at the display 18, and returns to decision block 242 and repeats. If the processor core complex 12 determines that there is not an indication that the display 18 and/or the device 10 is about to be used or in use, then the processor core complex 12, then, in process block 260, the processor core complex 12 stores the voltage differences determined during current sensing from process block 260 in an updated voltage difference lookup table or map 145, and resets the usage timer. In this manner, the process 240 may determine an appropriate time to sense and store voltage differences used to compensate for operational differences (e.g., aging) of the display 18.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display comprising:

a pixel, wherein the pixel comprises:

a diode configured to emit light based at least in part on an amount of current through the diode; and a driver transistor configured to control the amount of current flowing through the diode based at least in part on a voltage applied to the driver transistor;

driver-integrated circuitry configured to, during a current sensing process associated with not displaying image content via the diode:

send a hysteresis-reducing signal to the driver transistor;

send a threshold-settling signal to the driver transistor;

send a test voltage to the driver transistor without illuminating the diode, wherein the driver-integrated circuitry is configured to send the test voltage to the driver transistor without illuminating the diode by reducing a source voltage of the driver transistor, wherein the diode is directly electrically coupled to a drain of the driver transistor; and sense a current across the driver transistor in response to the test voltage;

a plurality of display regions, wherein a first display region of the plurality of display regions comprises the pixel; and a plurality of power planes configured to selectively supply independent supply voltages to the plurality of display regions, wherein a first power plane of the plurality of power planes is configured to supply a first supply voltage of the independent supply voltages to the first display region during the current sensing process, and wherein a second power plane of the plurality of power planes is configured to supply a second supply voltage of the independent supply voltages to a second display region, of the plurality of display regions, configured to display the image content while the first display region undergoes the current sensing process.

2. The electronic display of claim 1, communicatively coupled to processing circuitry separate from the electronic display, wherein the processing circuitry is configured to adjust image data configured to be sent to the pixel to compensate for operational variations of the electronic display based at least in part on the current sensed across the driver transistor.

3. The electronic display of claim 2, wherein the processing circuitry is configured to adjust the image data at least in part by:

determining a certain voltage based at least in part on the current and a predetermined current-voltage relationship determined at an initial temperature;

determining a voltage difference between the test voltage and the certain voltage; and applying a sum of the certain voltage and the voltage difference to the driver transistor.

4. The electronic display of claim 2, wherein the electronic display comprises a plurality of regions of pixels, wherein a region of pixels of the plurality of regions of pixels comprises the pixel, wherein the processing circuitry is configured to adjust the image data at least in part by:

determining a certain voltage based at least in part on the current and a predetermined current-voltage relationship determined at an initial temperature;

determining a voltage difference between the test voltage and the certain voltage; and applying a sum of the certain voltage and the voltage difference to a second driver transistor of a second pixel of the region of pixels.

5. The electronic display of claim 1, wherein the driver-integrated circuitry is configured to send the hysteresis-reducing signal, send the threshold-settling signal, and sense the current during an off-time of the electronic display.

6. The electronic display of claim 1, wherein the hysteresis-reducing signal is configured to alternate between a higher voltage value and a lower voltage value.

7. The electronic display of claim 1, wherein the threshold-settling signal comprises a settling voltage, wherein the threshold-settling signal is configured to settle a threshold voltage of the driver transistor to the settling voltage.

8. A method comprising:

determining whether a usage time since a previous current sensing process of a display of an electronic device has exceeded a compensation time threshold;

determining whether a current time is indicative of a lack of use of the electronic device in response to determining that the usage time has exceeded the compensation time threshold;

determining whether the electronic device is charging or a battery of the electronic device has sufficient charge; and in response to determining that the current time is indicative of the lack of use of the electronic device and that the electronic device is charging or the battery of the electronic device has sufficient charge, performing a current sensing process, wherein the current sensing process comprises:

sending a hysteresis-reducing signal to a transistor of pixel driving circuitry configured to provide power to a diode of the display;

sending a test voltage to the transistor; and sensing current in response to the test voltage.

9. The method of claim 8, comprising determining whether the usage time has exceeded a second compensation time threshold, less than the compensation time threshold, wherein the compensation time threshold is associated with a higher urgency to initiate the current sensing process than the second compensation time threshold.

10. The method of claim 8, comprising determining whether the current time is nighttime in response to determining that the usage time has exceeded the compensation time threshold, wherein determining whether the current time is indicative of the lack of use of the electronic device occurs in response to determining that the current time is nighttime in response to determining that the usage time has exceeded the compensation time threshold.

11. The method of claim 8, comprising determining whether a temperature at the display is sufficiently stable in response to determining that the electronic device is charging or the battery of the electronic device has sufficient charge, wherein sending the hysteresis-reducing signal to the transistor, sending the test voltage to the transistor, and sensing the current, occur in response to determining that the temperature at the electronic device is sufficiently stable.

12. The method of claim 8, comprising:

determining a predetermined current-voltage relationship of a pixel of the display at initial conditions, the pixel comprising the diode;

determining a certain voltage corresponding to the current based at least in part on the predetermined current-voltage relationship;

determining a voltage difference between the certain voltage and the test voltage; and storing the voltage difference in a lookup table.

13. The method of claim 12, comprising:

determining a gamma voltage value configured to cause the diode of the pixel to emit light at a target luminance; and determining a gain voltage value or an offset voltage value configured to adjust the gamma voltage value and cause the diode to emit the light of the target luminance.

14. The method of claim 13, comprising applying a sum of the voltage difference, the gamma voltage value, and the gain voltage value or the offset voltage value at the pixel to cause the diode of the pixel to emit the light of the target luminance.

15. The method of claim 8, comprising:

determining whether the electronic device is about to be used or in use while sending the hysteresis-reducing signal to the transistor, sending the test voltage to the transistor, or sensing the current; and interrupting sending the hysteresis-reducing signal to the transistor, sending the test voltage to the transistor, or sensing the current at the display, in response to determining that the electronic device is about to be used or in use.

16. The method of claim 15, wherein determining whether the electronic device is about to be used or in use comprises receiving sensor information from a movement sensor of the electronic device that the electronic device is being picked up or receiving an input signal from an input structure that the electronic device is being turned on.

17. The method of claim 8, wherein sending the test voltage to the transistor comprises sending the test voltage to the transistor without illuminating the diode.

18. An electronic device comprising:

a display comprising:

a plurality of regions of pixels, wherein a pixel of a region of pixels of the plurality of regions of pixels comprises:

a diode configured to emit light associated with image content based at least in part on an amount of current through the diode; and one or more transistors configured to control the amount of current flowing through the diode based at least in part on a data voltage associated with the image content;

driver-integrated circuitry configured to, during a current sensing period associated with not displaying the image content via the pixel:

apply a hysteresis-reducing signal to a transistor of the one or more transistors;

apply a threshold-settling voltage to the transistor;

apply a test voltage to the transistor; and sense a current across the transistor in response to the test voltage; and a plurality of power planes, wherein each power plane is separately provided a plurality of supply voltages, wherein a first power plane of the plurality of power planes is configured to supply a first supply of power to the region of pixels of the plurality of regions of pixels, wherein a second power plane of the plurality of power planes is configured to supply a second supply of power, different from the first supply of power, to a second region of pixels of the plurality of regions of pixels and cause the image content to be displayed in the second region during the current sensing period of the pixel; and processing circuitry communicatively coupled to the display, wherein the processing circuitry is configured to:

determine a voltage compensation based at least in part on the current; and during a display period associated with displaying the image content via the diode, generate the data voltage based at least in part on the voltage compensation.

19. The electronic device of claim 18, wherein the processing circuitry is configured to enable displaying of the image content, via the second power plane, on at least a portion of the display when the display is in a sleep mode.

20. The electronic device of claim 18, wherein the processing circuitry is configured to independently select respective operating modes for the plurality of power planes, wherein the first supply of power is associated with a first operating mode of the respective operating modes and the second supply of power is associated with a second operating mode of the respective operating modes.

* * * * *